United States Patent
Huang et al.

(10) Patent No.: US 10,158,990 B2
(45) Date of Patent: Dec. 18, 2018

(54) SMS MESSAGE READING CONTROL METHOD AND TERMINAL

(71) Applicant: Huawei Technologies Co., Ltd., Shenzhen (CN)

(72) Inventors: Xi Huang, Shenzhen (CN); Huangwei Wu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/553,726

(22) PCT Filed: Mar. 27, 2015

(86) PCT No.: PCT/CN2015/075192
§ 371 (c)(1),
(2) Date: Aug. 25, 2017

(87) PCT Pub. No.: WO2016/154783
PCT Pub. Date: Oct. 6, 2016

(65) Prior Publication Data
US 2018/0054731 A1     Feb. 22, 2018

(51) Int. Cl.
*H04W 12/02* (2009.01)
*H04W 4/14* (2009.01)
(Continued)

(52) U.S. Cl.
CPC ............. *H04W 12/02* (2013.01); *H04L 67/20* (2013.01); *H04W 4/14* (2013.01); *H04W 12/08* (2013.01);
(Continued)

(58) Field of Classification Search
CPC ....... H04W 4/14; H04W 12/02; H04W 12/08; H04L 67/20; H04L 67/306; H04L 63/0876
See application file for complete search history.

(56) References Cited

U.S. PATENT DOCUMENTS

| | | | |
|---|---|---|---|
| 8,699,998 B2 | 4/2014 | Sprigg et al. | |
| 2007/0275739 A1* | 11/2007 | Blackburn | H04L 12/585 |
| | | | 455/466 |
| 2015/0163186 A1* | 6/2015 | Tian | H04L 51/18 |
| | | | 709/206 |

FOREIGN PATENT DOCUMENTS

| | | |
|---|---|---|
| CN | 1885967 A | 12/2006 |
| CN | 102695161 A | 9/2012 |

(Continued)

OTHER PUBLICATIONS

"Technical Requirements for Intelligent Terminal Software Platform Operating System," The General Administration of Quality, 2013, 28 pages.
(Continued)

*Primary Examiner* — Magdi Elhag
(74) *Attorney, Agent, or Firm* — Slater Matsil, LLP

(57) ABSTRACT

The present invention relates to a short message service (SMS) message reading control method and a terminal. The method includes storing a correspondence between a first application and a first sender of an SMS message and receiving a target SMS message generated by an application server corresponding to the first application, where the target SMS message includes information about the first sender. The method also includes determining, according to the information about the first sender in the target SMS message and the correspondence, to provide the first application with the target SMS message, so that the first application obtains the target SMS message.

20 Claims, 14 Drawing Sheets

(51) Int. Cl.
 *H04W 12/08* (2009.01)
 *H04L 29/08* (2006.01)
 H04L 12/58 (2006.01)
 H04L 29/06 (2006.01)
 H04W 12/12 (2009.01)

(52) U.S. Cl.
 CPC ............ *H04L 51/046* (2013.01); *H04L 51/38* (2013.01); *H04L 63/0838* (2013.01); *H04W 12/12* (2013.01)

(56) References Cited

FOREIGN PATENT DOCUMENTS

| CN | 104270763 | 1/2015 |
|---|---|---|
| CN | 104301875 | 1/2015 |
| CN | 104301876 A | 1/2015 |

OTHER PUBLICATIONS

Mulliner, C. et al., "SMS-Based One-Time Passwords: Attacks and Defense( Short Paper)," Jul. 18, 2013, pp. 150-159.

\* cited by examiner

SMS MESSAGE READING CONTROL METHOD AND TERMINAL

CROSS-REFERENCE TO RELATED APPLICATIONS

This application is a national stage of International Application No. PCT/CN2015/075192, filed on Mar. 27, 2015, which is hereby incorporated by reference in its entirety.

TECHNICAL FIELD

The present invention relates to the field of communications technologies, and in particular, to short message service (SMS) message reading control method and a terminal.

BACKGROUND

With the advent of various security events, a common login password cannot meet an operation of a high security risk. More application developers perform authentication on login or a sensitive operation of an application to ensure security of the login or the sensitive operation, and a short message service (SMS) verification code is a most common manner.

Currently, in an Android™ system, an application program may read all SMS messages in a system by applying for permission for reading an SMS message, and the Android system grants, to the application, permission for reading all SMS message records. After the system receives an SMS message, a broadcast indicating that an SMS message is received is sent in the system. After receiving the broadcast, an application having SMS message reading permission may read SMS message content, extract a verification code from the SMS message content, and fill the verification code in a verification code input box of the application.

Therefore, the application may read not only normal verification code information but also SMS messages that are received or sent by a user when the user normally uses an SMS message application. This easily causes disclosure of user privacy and relatively poor user experience.

SUMMARY

Embodiments of the present invention provide a short message system (SMS) message reading control method and a terminal. A first application is allowed to read only an SMS message sent by a specific SMS message sender, so that user experience can be improved, and user privacy can be protected.

According to a first aspect, an embodiment of the present invention provides an SMS message reading control method. The method includes storing a correspondence between a first application and a first sender of an SMS message and receiving a target SMS message generated by an application server corresponding to the first application, where the target SMS message includes information about the first sender. The method also includes determining, according to the information about the first sender in the target SMS message and the correspondence, to provide the first application with the target SMS message, so that the first application obtains the target SMS message.

With reference to the first aspect, in a first possible implementation manner of the first aspect, the storing a correspondence between a first application and a first sender of an SMS message includes: storing a correspondence between the first application and a number of the first sender of the SMS message in a registration list.

With reference to the first possible implementation manner of the first aspect, in a second possible implementation manner of the first aspect, before storing a correspondence between the first application and a number of the first sender of the SMS message in a registration list, the method further includes: obtaining the number of the first sender of the SMS message.

With reference to the second possible implementation manner of the first aspect, in a third possible implementation manner of the first aspect, the obtaining the number of the first sender of the SMS message includes when the first application is installed, recording the number that is of the first sender of the SMS message and that is in an installation package of the first application, or when the first application is run, sending a request message to the application server corresponding to the first application to obtain the number of the first sender of the SMS message. The method also includes receiving and recording the number, sent by the application server, of the first sender of the SMS message.

With reference to the second or the third possible implementation manner of the first aspect, in a fourth possible implementation manner of the first aspect, after the obtaining the number of the first sender of the SMS message, the method further includes: determining that the number of the first sender of the SMS message is not registered by another application; or determining that the number of the first sender of the SMS message is a common service number.

With reference to the second or the third possible implementation manner of the first aspect, in a fifth possible implementation manner of the first aspect, after the obtaining the number of the first sender of the SMS message, the method further includes: receiving first input of a user, where the first input is used to instruct to store the correspondence between the first application and the number of the first sender of the SMS message.

With reference to the first possible implementation manner of the first aspect, in a sixth possible implementation manner of the first aspect, the storing a correspondence between a first application and a first sender of an SMS message includes: storing a correspondence between the first application and a number of the first sender of the SMS message by using a yellow pages service.

With reference to the first possible implementation manner of the first aspect, in a seventh possible implementation manner of the first aspect, the storing a correspondence between a first application and a first sender of an SMS message includes: storing a correspondence that is between the first application and a number of the first sender of the SMS message and that is obtained from a third-party server.

With reference to any one of the first to the seventh possible implementation manners of the first aspect, in an eighth possible implementation manner of the first aspect, the determining, according to the information about the first sender in the target SMS message and the correspondence, to provide the first application with the target SMS message includes: searching the correspondence between the first application and the number of the first sender of the SMS message; and when a number of a first sender in the target SMS message is the same as the number of the first sender of the SMS message corresponding to the first application, determining to provide the first application with the target SMS message.

With reference to any one of the first to the eighth possible implementation manners of the first aspect, in a ninth possible implementation manner of the first aspect, before the determining, according to the information about the first sender in the target SMS message and the correspondence, to provide the first application with the target SMS message, the method further includes: obtaining the correspondence between the first application and the number of the first sender of the SMS message.

With reference to the first possible implementation manner of the first aspect, in a tenth possible implementation manner of the first aspect, the storing a correspondence between a first application and a first sender of an SMS message includes: storing a correspondence between the first application and a keyword of an SMS message sent by the first sender of the SMS message.

With reference to the first possible implementation manner of the first aspect, in an eleventh possible implementation manner of the first aspect, the storing a correspondence between a first application and a first sender of an SMS message includes: storing a correspondence that is between the first application and a keyword of an SMS message sent by the first sender of the SMS message and that is obtained from a third-party server.

With reference to the tenth or the eleventh possible implementation manner of the first aspect, in a twelfth possible implementation manner of the first aspect, the determining, according to the information about the first sender in the target SMS message and the correspondence, to provide the first application with the target SMS message includes: searching the correspondence between the first application and the keyword of the SMS message sent by the first sender of the SMS message; and when a keyword of the target SMS message is the same as the keyword of the SMS message sent by the first sender of the SMS message corresponding to the first application, determining to provide the first application with the target SMS message.

With reference to any one of the tenth to the twelfth possible implementation manners of the first aspect, in a thirteenth possible implementation manner of the first aspect, before the determining, according to the information about the first sender in the target SMS message and the correspondence, to provide the first application with the target SMS message, the method further includes: obtaining the correspondence between the first application and the keyword of the SMS message sent by the first sender of the SMS message.

With reference to any one of the foregoing possible implementation manners, in a fourteenth possible implementation manner of the first aspect, the receiving a target SMS message generated by an application server corresponding to the first application includes: receiving the target SMS message that is generated by the application server and sent by an SMS server or an instant messaging server.

With reference to the first possible implementation manner of the first aspect, in a fifteenth possible implementation manner of the first aspect, after receiving a target SMS message generated by an application server corresponding to the first application, the method further includes: receiving a request message, sent by a second application, for obtaining the target SMS message, where the second application is not corresponding to the first sender; and determining, according to the information about the first sender in the target SMS message and the correspondence, not to provide the second application with the target SMS message.

With reference to the fifteenth possible implementation manner of the first aspect, in a sixteenth possible implementation manner of the first aspect, the method further includes: sending an invalid SMS message to the second application.

According to a second aspect, an embodiment of the present invention provides a terminal. The terminal includes: a storing module, configured to store a correspondence between a first application and a first sender of an SMS message; a first receiving module, configured to receive a target SMS message generated by an application server corresponding to the first application, where the target SMS message includes information about the first sender; and a first determining module, configured to determine, according to the information about the first sender in the target SMS message received by the first receiving module and the correspondence stored by the storing module, to provide the first application with the target SMS message, so that the first application obtains the target SMS message.

With reference to the second aspect, in a first possible implementation manner of the second aspect, the storing module is specifically configured to store a correspondence between the first application and a number of the first sender of the SMS message in a registration list.

With reference to the first possible implementation manner of the second aspect, in a second possible implementation manner of the second aspect, the terminal further includes: a first obtaining module, configured to obtain the number of the first sender of the SMS message.

With reference to the second possible implementation manner of the second aspect, in a third possible implementation manner of the second aspect, the first obtaining module is specifically configured to: when the first application is installed, record the number that is of the first sender of the SMS message and that is in an installation package of the first application; or when the first application is run, send a request message to the application server corresponding to the first application to obtain the number of the first sender of the SMS message, and receive and record the number, sent by the application server, of the first sender of the SMS message.

With reference to the second or the third possible implementation manner of the second aspect, in a fourth possible implementation manner of the second aspect, the terminal further includes: a second determining module, configured to determine that the number of the first sender of the SMS message is not registered by another application; or configured to determine that the number of the first sender of the SMS message is a common service number.

With reference to the second or the third possible implementation manner of the second aspect, in a fourth possible implementation manner of the second aspect, the terminal further includes: a second receiving module, configured to receive first input of a user, where the first input is used to instruct to store the correspondence between the first application and the number of the first sender of the SMS message.

With reference to the first possible implementation manner of the second aspect, in a sixth possible implementation manner of the second aspect, the storing module is specifically configured to store a correspondence between the first application and a number of the first sender of the SMS message by using a yellow pages service.

With reference to the first possible implementation manner of the second aspect, in a sixth possible implementation manner of the second aspect, the storing module is specifically configured to store a correspondence that is between the first application and a number of the first sender of the SMS message and that is obtained from a third-party server.

With reference to any one of the first to the seventh possible implementation manners of the second aspect, in an eighth possible implementation manner of the second aspect, the first determining module is specifically configured to: search the correspondence between the first application and the number of the first sender of the SMS message; and when a number of a first sender in the target SMS message is the same as the number of the first sender of the SMS message corresponding to the first application, determine to provide the first application with the target SMS message.

With reference to any one of the first to the eighth possible implementation manners of the second aspect, in a ninth possible implementation manner of the second aspect, the terminal further includes: a second obtaining module, configured to obtain the correspondence between the first application and the number of the first sender of the SMS message.

With reference to the first possible implementation manner of the second aspect, in a tenth possible implementation manner of the second aspect, the storing module is specifically configured to store a correspondence between the first application and a keyword of an SMS message sent by the first sender of the SMS message.

With reference to the first possible implementation manner of the second aspect, in a tenth possible implementation manner of the second aspect, the storing module is specifically configured to store a correspondence that is between the first application and a keyword of an SMS message sent by the first sender of the SMS message and that is obtained from a third-party server.

With reference to the tenth or the eleventh possible implementation manner of the second aspect, in a twelfth possible implementation manner of the second aspect, the first determining module is specifically configured to search the correspondence between the first application and the keyword of the SMS message sent by the first sender of the SMS message; and when a keyword of the target SMS message is the same as the keyword of the SMS message sent by the first sender of the SMS message corresponding to the first application, determine to provide the first application with the target SMS message.

With reference to any one of the tenth to the twelfth possible implementation manners of the second aspect, in a thirteenth possible implementation manner of the second aspect, the terminal further includes: a third obtaining module, configured to obtain the correspondence between the first application and the keyword of the SMS message of the first sender of the SMS message.

With reference to any one of the foregoing possible implementation manners, in a fourteenth possible implementation manner of the second aspect, the first receiving module is specifically configured to receive the target SMS message that is generated by the application server and sent by an SMS server or an instant messaging server.

With reference to the first possible implementation manner of the second aspect, in a fifteenth possible implementation manner of the second aspect, the terminal further includes: a third receiving module, configured to receive a request message, sent by a second application, for obtaining the target SMS message, where the second application is not corresponding to the first sender; and a third determining module, configured to determine, according to the information about the first sender in the target SMS message and the correspondence, not to provide the second application with the target SMS message.

With reference to the fifteenth possible implementation manner of the second aspect, in a sixteenth possible implementation manner of the second aspect, the terminal further includes: a sending module, configured to send an invalid SMS message to the second application.

Based on the foregoing technical solutions, in an SMS message reading control method provided in the embodiments of the present invention, a target SMS message generated by an application server corresponding to a first application is received, where the target SMS message includes information about a first sender; and it is determined, according to the information about the first sender in the target SMS message and a stored correspondence between the first application and the first sender of an SMS message, to provide the first application with the target SMS message, so that the first application obtains the target SMS message. Therefore, the first application can read only an SMS message sent by a specific SMS message sender, thereby improving user experience and protecting user privacy.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
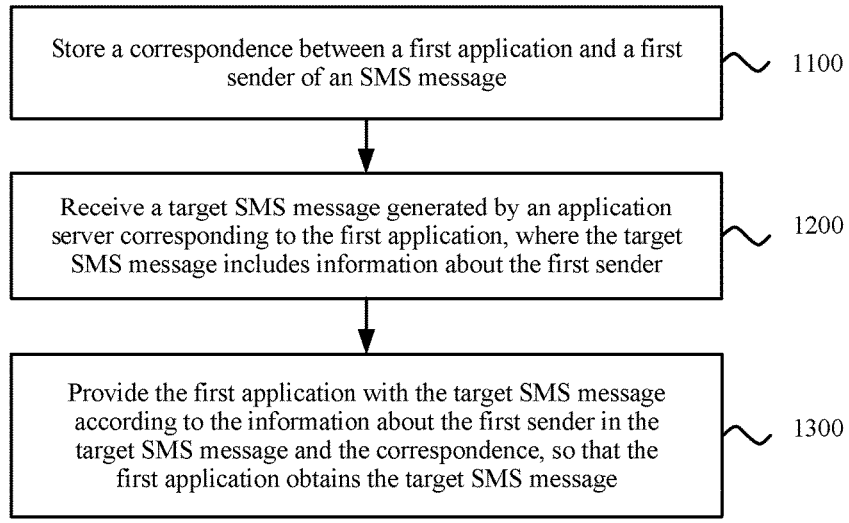
FIG. 1 is a schematic flowchart of an SMS message reading control method according to an embodiment of the present invention.

FIG. 1 is a schematic flowchart of a short message service (SMS) message reading control method 1000 according to an embodiment of the present invention. The method 1000 shown in FIG. 1 may be executed by a terminal, and the method 1000 includes the following steps.

1100. Store a correspondence between a first application and a first sender of an SMS message.

1200. Receive a target SMS message generated by an application server corresponding to the first application, where the target SMS message includes information about the first sender.

1300. Determine, according to the information about the first sender in the target SMS message and the correspondence, to provide the first application with the target SMS message, so that the first application obtains the target SMS message.

Specifically, to protect user privacy, an operating system of the terminal may receive the target SMS message generated by the application server corresponding to the first application, where the target SMS message includes the information about the first sender; and determine, according to the information about the first sender in the target SMS message and the stored correspondence between the first application and the first sender of the SMS message, to provide the first application with the target SMS message, so that the first application obtains the target SMS message.

It should be understood that, in this embodiment of the present invention, the information about the first sender may be a number of the first sender, or may be a keyword of the target SMS message sent by the first sender. The keyword of the target SMS message may be a name of the first application. However, this embodiment of the present invention is not limited thereto.

Therefore, according to an SMS message reading control method provided in this embodiment of the present invention, a target SMS message generated by an application server corresponding to a first application is received. The target SMS message includes information about a first sender. It is determined, according to the information about the first sender in the target SMS message and a stored correspondence between the first application and the first sender of an SMS message, to provide the first application with the target SMS message, so that the first application obtains the target SMS message. Therefore, the first application can read only an SMS message sent by a specific SMS message sender, thereby improving user experience and protecting user privacy.

Figure 2:
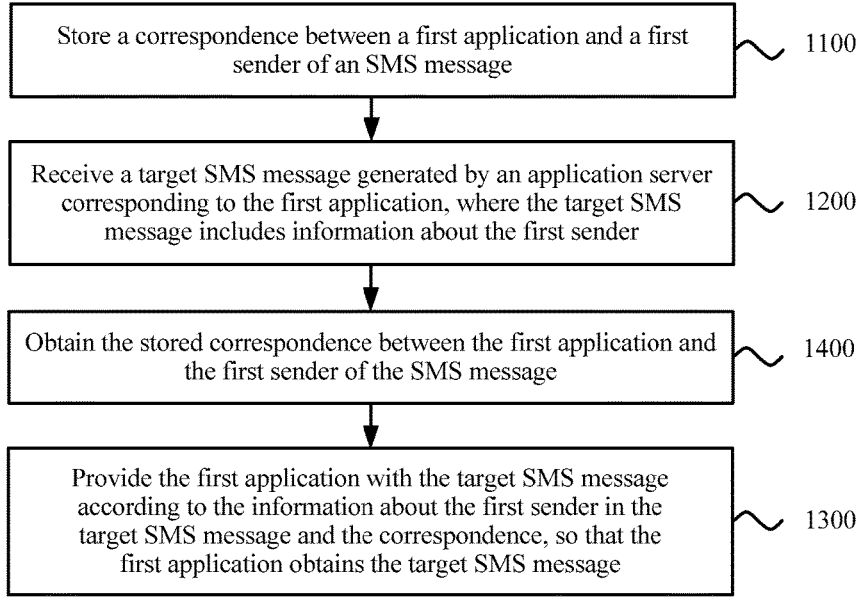
FIG. 2 is a schematic flowchart of an SMS message reading control method according to another embodiment of the present invention.

Optionally, in an embodiment of the present invention, as shown in FIG. 2, before 1300, the method 1000 further includes.

1400. Obtain the stored correspondence between the first application and the first sender of the SMS message.

In 1100, the operating system of the terminal may store the correspondence that is between the first application and the first sender of the SMS message and that is obtained over a network, that is, may store the correspondence that is between the first application and the first sender of the SMS message and that is obtained from a third-party server. For example, a correspondence that is between the first application and a number of the first sender of the SMS message and that is obtained from the third-party server may be stored by using a yellow pages function. Alternatively, a correspondence that is between the first application and a keyword of an SMS message sent by the first sender of the SMS message and that is obtained from the third-party server may be stored.

It should be understood that, in this embodiment of the present invention, a keyword of an SMS message may be a name of an application. For example, content of an SMS message is: an SMS message/a multimedia message from Tencent™. A keyword of the SMS message is Tencent™. However, this embodiment of the present invention is not limited thereto. A keyword of the SMS message may be a keyword obtained in another manner of extracting a keyword.

In 1100, the operating system of the terminal may further store a locally obtained correspondence between the first application and the first sender of the SMS message.

Figure 3:
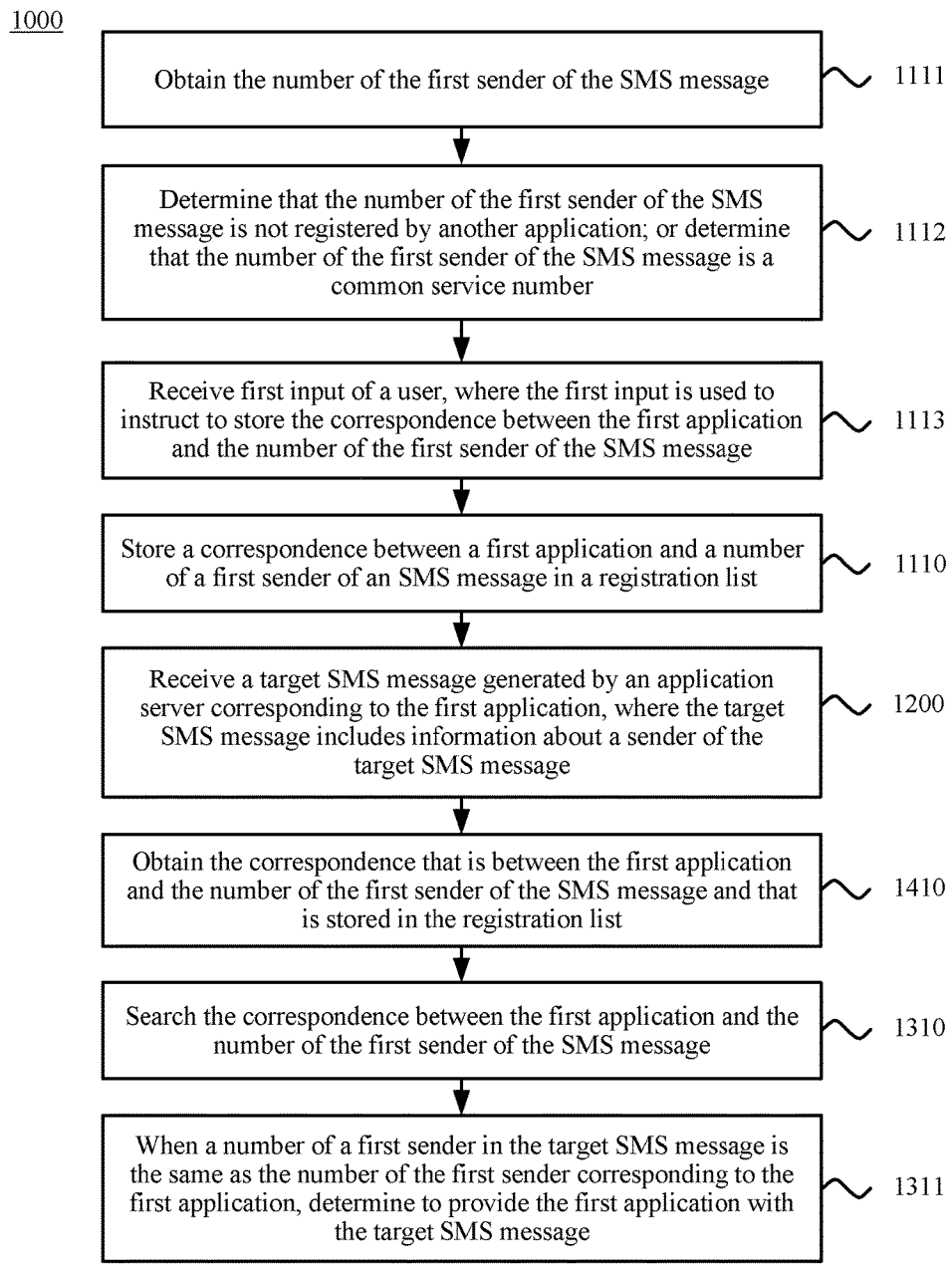
FIG. 3 is a schematic flowchart of an SMS message reading control method according to still another embodiment of the present invention.
Figure 4:
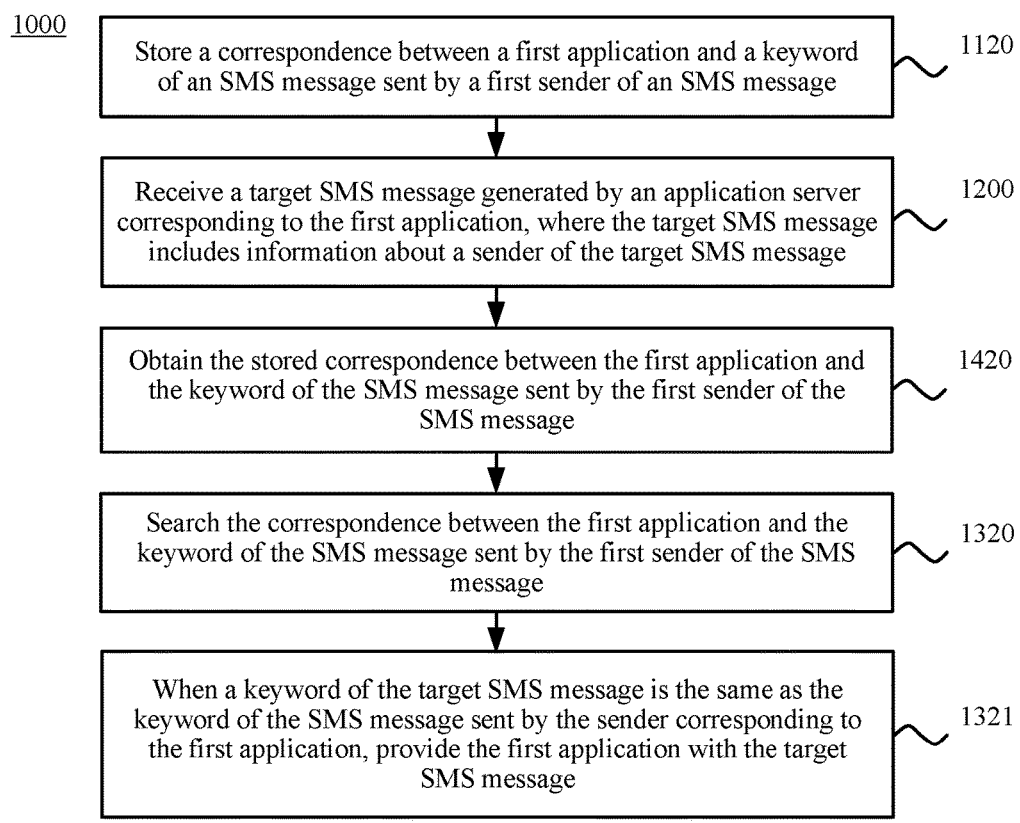
FIG. 4 is a schematic flowchart of an SMS message reading control method according to yet another embodiment of the present invention.

The following describes in detail a technical solution to storing the locally obtained correspondence between the first application and the first sender of the SMS message with reference to FIG. 3 and FIG. 4.

Specifically, in this embodiment of the present invention, as shown in FIG. 3, 1100 may include the following steps.

1110. Store a correspondence between the first application and a number of the first sender of the SMS message in a registration list.

Optionally, in this embodiment of the present invention, in addition to storing the correspondence between the first application and the number of the first sender of the SMS message in the registration list, the correspondence between the first application and the number of the first sender of the SMS message may be stored by using the yellow pages service.

Optionally, in another embodiment of the present invention, before 1110, the method 1000 further includes.

1111. Obtain the number of the first sender of the SMS message.

Specifically, in this embodiment of the present invention, the number of the first sender of the SMS message may be obtained in the following two manners.

Manner 1: When the first application is installed, record the number that is of the first sender of the SMS message and that is in an installation package of the first application. That is, a configuration file of the installation package of the first application includes the number that needs to be received by the first application and that is of the first sender of the SMS message. When the first application is installed, the operating system of the terminal may obtain the number of the first sender of the SMS message from the configuration file of the installation package.

Manner 2: When the first application is run, send a first request message to the application server corresponding to the first application to obtain the number of the first sender of the SMS message, and receive and record the number, sent by the application server, of the first sender of the SMS message. That is, when running the first application, the operating system of the terminal may send a first request message used for obtaining the number of the first sender of the SMS message to the application server corresponding to the first application, where the first request message may include a mobile number used for receiving the SMS message. The application server may feed back, to the operating system of the terminal according to the first request message, the number of the first sender of the SMS message that needs to be received by the first application, and the operating system of the terminal receives and records the number of the first sender of the SMS message.

It should be understood that, in this embodiment of the present invention, the mobile number used for receiving the SMS message may be a mobile number entered by a user for receiving the SMS message, or may be a local mobile number that is directly extracted. This embodiment of the present invention imposes no limitation on this.

Optionally, in another embodiment of the present invention, after 1111, the method 1000 further includes:

1112. Determine that the number of the first sender of the SMS message is not registered by another application; or determine that the number of the first sender of the SMS message is a common service number.

Specifically, in this embodiment of the present invention, after the number of the first sender of the SMS message is obtained, validity of the number of the first sender of the SMS message further needs to be determined. That is, that the number of the first sender of the SMS message is not registered by another application, or that the number of the first sender of the SMS message is a common service number needs to be determined. It should be understood that, in this embodiment of the present invention, the common service number means that the number of the first sender of the SMS message is not a number of a mobile phone contact but a number used for a public service, for example, a service number of China Merchants Bank™, 95555, and a service number of Alipay™, 95188.

Optionally, in another embodiment of the present invention, after 1111, the method 1000 further includes.

1113. Receive first input of a user, where the first input is used to instruct to store the correspondence between the first application and the number of the first sender of the SMS message.

Specifically, in this embodiment of the present invention, after obtaining the number of the first sender of the SMS message, the operating system of the terminal may further receive the first input of the user, and store the correspondence between the first application and the number of the first sender of the SMS message according to the first input. For example, after it is determined that the number of the first sender of the SMS message is not registered by another application other than the first application, or is the common service number, the correspondence between the first application and the number of the first sender of the SMS message is stored in the registration list according to a received first instruction.

Specifically, in this embodiment of the present invention, before 1300, the method 1000 further includes.

1410. Obtain the correspondence that is between the first application and the number of the first sender of the SMS message and that is stored in the registration list.

Specifically, in this embodiment of the present invention, 1300 further includes the following steps.

1310. Search the correspondence between the first application and the number of the first sender of the SMS message.

1311. When a number of a first sender in the target SMS message is the same as the number of the first sender of the SMS message corresponding to the first application, determine to provide the first application with the target SMS message.

Specifically, in this embodiment of the present invention, the operating system of the terminal stores the correspondence between the first application and the number of the first sender of the SMS message; receives the target SMS message generated by the application server corresponding to the first application, where the target SMS message includes the information about the first sender; obtains the stored correspondence between the application and the number of the first sender of the SMS message; searches the correspondence between the first application and the number of the first sender of the SMS message; and when the number of the first sender in the target SMS message is the same as the number of the first sender of the SMS message corresponding to the first application, determines to provide the first application with the target SMS message. For example, the first application receives and can directly read the target SMS message. Alternatively, before 1300, the first application may send, to the operating system, a message used for requesting for reading the target SMS message. When it is determined in 1311 to provide the first application with the target SMS message, the operating system of the terminal may send the target SMS message to the first application according to the request message, and the first application receives and reads the target SMS message.

Optionally, in another embodiment of the present invention, as shown in FIG. 4, 1100 may include.

1120. Store a correspondence between the first application and a keyword of an SMS message sent by the first sender of the SMS message.

Specifically, in this embodiment of the present invention, before 1300, the method 1000 further includes.

1420. Obtain the stored correspondence between the first application and the keyword of the SMS message sent by the first sender of the SMS message.

Specifically, in this embodiment of the present invention, 1300 further includes the following steps.

1320. Search the correspondence between the first application and the keyword of the SMS message sent by the first sender of the SMS message.

1321. When a keyword of the target SMS message is the same as the keyword of the SMS message sent by the first sender of the SMS message corresponding to the first application, determine to provide the first application with the target SMS message.

Specifically, in this embodiment of the present invention, the operating system of the terminal stores the correspondence between the first application and the keyword of the SMS message sent by the first sender of the SMS message; receives the target SMS message generated by the application server corresponding to the first application; obtains the stored correspondence between the first application and the keyword of the SMS message sent by the first sender of the SMS message; searches the correspondence between the first application and the keyword of the SMS message sent by the first sender of the SMS message; and when the keyword of the target SMS message is the same as the keyword of the SMS message sent by the first sender of the SMS message corresponding to the first application, determines to provide the first application with the target SMS message. For example, the first application receives and can directly read the target SMS message. Alternatively, before 1300, the first application may send, to the operating system, a message used for requesting for reading the target SMS message. When it is determined in 1321 to provide the first application with the target SMS message, the operating system of the terminal may send the target SMS message to the first application according to the request message, and the first application receives and reads the target SMS message.

In 1200, the operating system of the terminal may receive the target SMS message that is generated by the application server corresponding to the first application and sent by an SMS server or an instant messaging server. It should be understood that, in this embodiment of the present invention, the instant messaging server may include WeChat™, QQ™, Credulity™, Microsoft Network (MSN)™, FICQ™, or the like. However, this embodiment of the present invention is not limited thereto. That is, in this embodiment of the present invention, the SMS message may be an SMS message sent by a server of an operator, or may be an instant message sent by an instant messaging server. This embodiment of the present invention imposes no limitation on this. It should be further understood that, in this embodiment of the present invention, the application server corresponding to the first application, for example, an application server corresponding to a QQ™ application is a server of Tencent QQ™, or an application server corresponding to an Alipay™ application is a server of Alipay™. The application server may be a server of an application developer, or may be a server leased by an application developer from another service provider. The present invention imposes no limitation on this.

Therefore, according to an SMS message reading control method provided in this embodiment of the present invention, a target SMS message generated by an application server corresponding to a first application is received. The target SMS message includes information about a first sender. It is determined, according to the information about the first sender in the target SMS message and a stored correspondence between the first application and the first sender of an SMS message, to provide the first application with the target SMS message, so that the first application obtains the target SMS message. Therefore, the first application can read only an SMS message sent by a specific SMS message sender, thereby improving user experience and protecting user privacy.

Optionally, in another embodiment of the present invention, after 1200, the method 1000 further includes: receiving a request message, sent by a second application, for obtaining the target SMS message, where the second application is not corresponding to the first sender; and determining, according to the information about the first sender in the target SMS message and the correspondence, not to provide the second application with the target SMS message.

Specifically, in this embodiment of the present invention, an operating system of a terminal stores a correspondence between a first application and a keyword of an SMS message of a first sender of an SMS message; receives a target SMS message generated by an application server corresponding to the first application; receives a request message, sent by a second application not corresponding to the first sender, for obtaining the target SMS message; and determines, according to information about the first sender in the target SMS message and a stored correspondence between the first application and the first sender of the SMS message, not to send the target SMS message to the second application, so as to ensure that the SMS message sent by the first sender can be read only by the first application corresponding to the first sender, thereby improving user experience and protecting user privacy.

In addition, an invalid SMS message may be sent to the second application, so as to avoid a problem such as a program exception triggered because the second application cannot receive a response. It should be understood that, in this embodiment of the present invention, the invalid SMS message may be empty information, may be an SMS message including privacy data, or may be an SMS message sent by an SMS message sender corresponding to the second application. This embodiment of the present invention imposes no limitation on this.

Figure 5A:
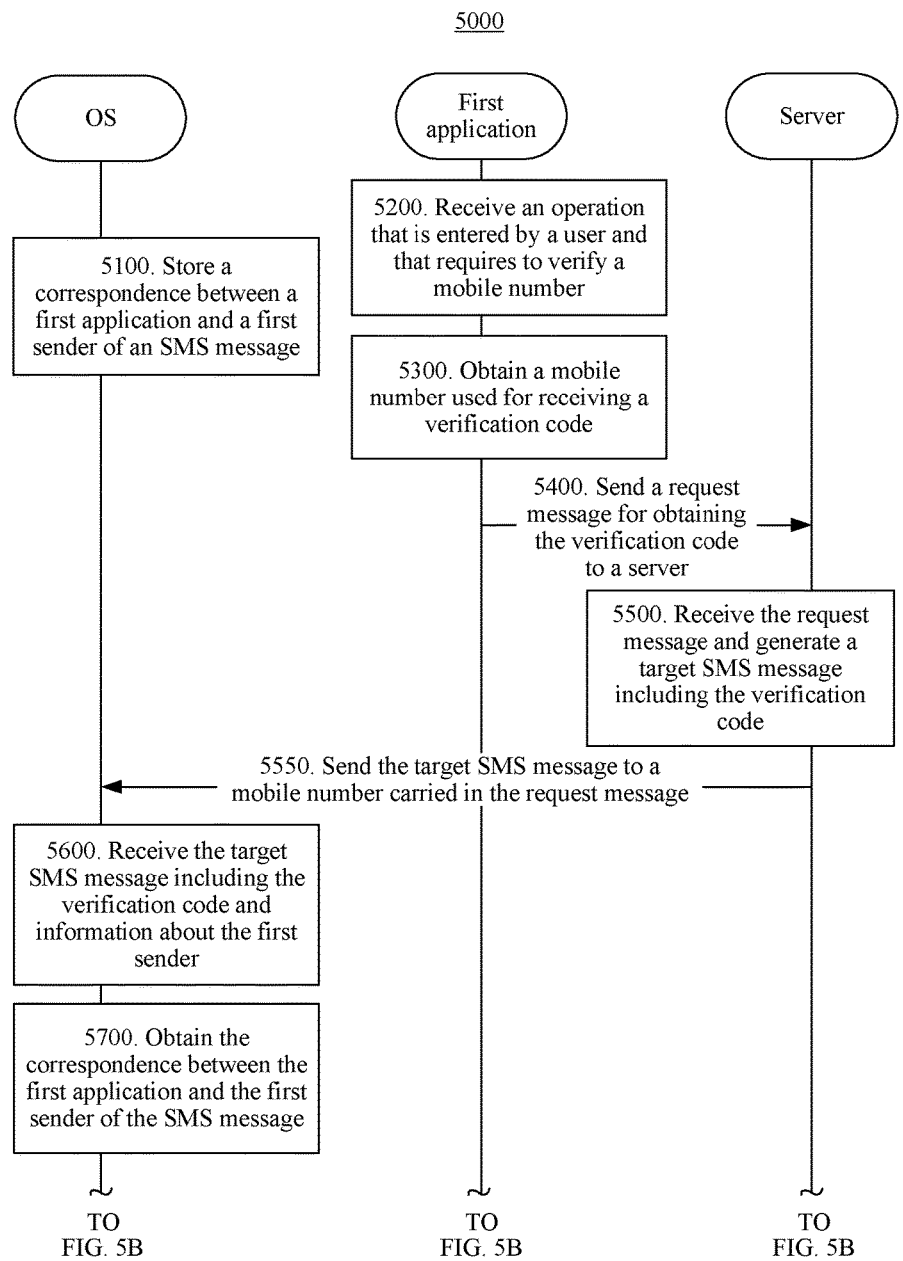
FIG. 5A and FIG. 5B are a schematic diagram of interaction of an SMS message reading control method according to an embodiment of the present invention.
Figure 5B:
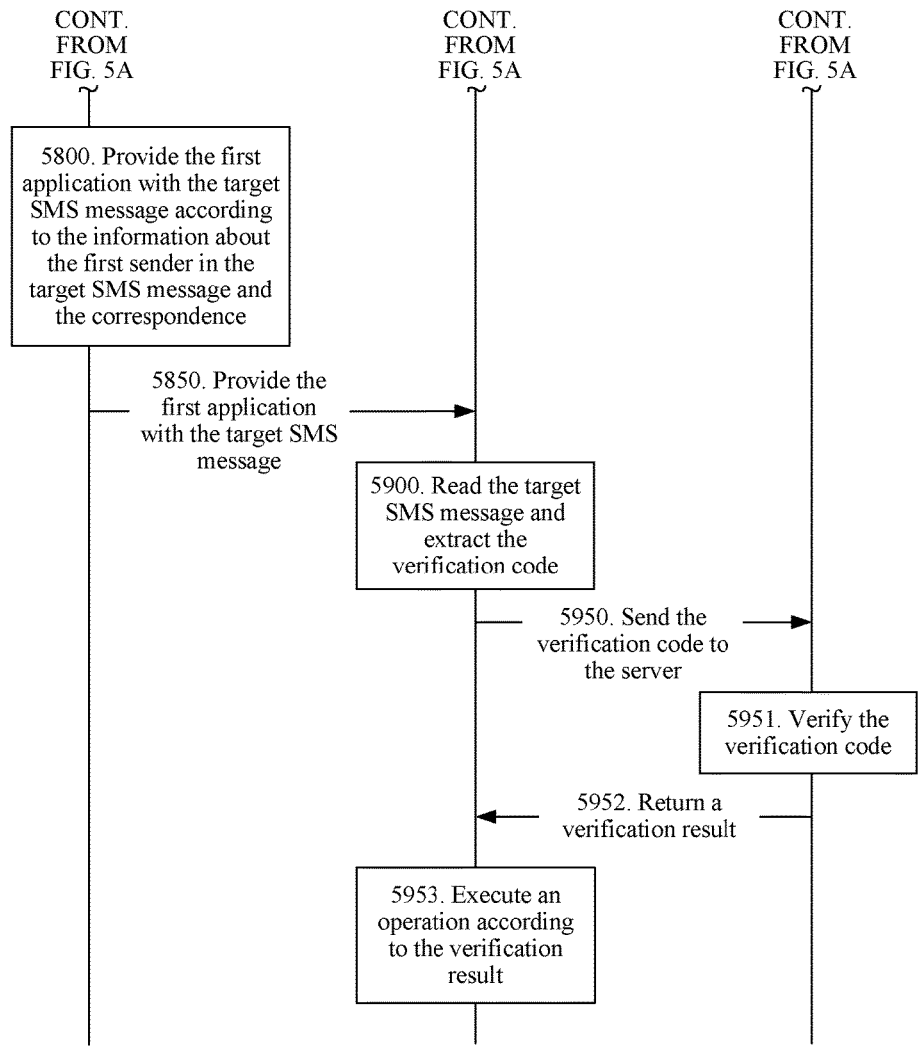

The following uses an operation that requires a user to verify a mobile number as an example and describes the technical solutions in the embodiments of the present invention in detail with reference to FIG. 5A and FIG. 5B. Both an operating system OS and a first application shown in FIG. 5A and FIG. 5B run on a terminal. It should be understood that this is intended to merely describe an example of the technical solutions of the embodiments of the present invention and imposes no limitation on the technical solutions of the embodiments of the present invention.

FIG. 5A and FIG. 5B are a schematic diagram of interaction of an SMS message reading method 500 according to an embodiment of the present invention. The method 5000 shown in FIG. 5A and FIG. 5B includes the following steps.

5100. Store a correspondence between a first application and a first sender of an SMS message.

It should be understood that, in this embodiment of the present invention, the correspondence that is between the first application and the first sender of the SMS message and that is obtained over a network or locally obtained may be stored. It should be further understood that, a correspondence between the first application and a number of the first sender of the SMS message may be stored, or a correspondence between the first application and a keyword of an SMS message sent by the first sender of the SMS message may be stored.

Before the correspondence between the first application and the number of the first sender of the SMS message is stored, there is a need to obtain the number of the first sender of the SMS message. There may be the following two manners of obtaining the number of the first sender of the SMS message: first, when the first application is installed, obtaining and recording a number that is of a first sender of an SMS message and that needs to be received by the first application and is included in a configuration file of an installation package of the first application; second, when the first application is run, sending a first request message to an application server corresponding to the first application to obtain the number of the first sender of the SMS message, and receiving and recording the number, sent by the application server, of the first sender of the SMS message.

After the number of the first sender of the SMS message is obtained, validity of the number of the first sender of the SMS message further needs to be determined. That is, that the number of the first sender of the SMS message is not registered by another application, or that the number of the first sender of the SMS message is a common service number needs to be determined. When it is determined that the number of the first sender of the SMS message is not registered by another application, or is the common service number, the operating system may record the correspondence between the first application and the number of the first sender of the SMS message in a registration list.

In addition, the correspondence between the first application and the number of the first sender of the SMS message may further be stored by using a yellow pages service.

5200. The first application receives an operation that is entered by a user and that requires to verify a mobile number.

In this embodiment of the present invention, the operation that requires to verify the mobile number may include: registering an account, logging in via an SMS message verification code, forgetting a password, resetting a password, and the like. However, this embodiment of the present invention is not limited thereto.

5300. The first application obtains a mobile number used for receiving a verification code.

In this embodiment of the present invention, the mobile number used for receiving the verification code may be a mobile number entered by the user for receiving the verification code, or may be a local mobile number that is directly extracted. This embodiment of the present invention imposes no limitation on this.

5400. The first application sends a request message for obtaining the verification code to an application server corresponding to the first application, where the request message includes the mobile number used for receiving the verification code.

5500. The application server receives the request message sent by the first application and generates a target SMS message including the verification code.

In this embodiment of the present invention, the target SMS message further includes information about a first sender of the target SMS message, for example, includes a number of the first sender of the target SMS message, or include a keyword of an SMS message sent by the first sender of the target SMS message, that is, may include a keyword of the target SMS message.

5550. The application server sends the target SMS message to an operating system by using an SMS server or an instant messaging server.

In this embodiment of the present invention, the application server sends, by using the SMS server or the instant messaging server, the target SMS message generated by the application server to the mobile number used for receiving the verification code.

5600. The operating system receives the target SMS message, where the target SMS message includes the verification code and information about the first sender.

5700. The operating system obtains the stored correspondence between the first application and the first sender of the SMS message.

5800. The operating system determines, according to the information about the first sender in the target SMS message and the obtained correspondence between the first application and the first sender of the SMS message, to provide the first application with the target SMS message.

In this embodiment of the present invention, if the target SMS message includes a number of a sender of the target SMS message, according to the correspondence that is between the first application and the number of the first sender of the SMS message and that is obtained by querying, when the number of the sender of the target SMS message is the same as the number of the first sender of the SMS message corresponding to the first application, the target SMS message is provided to the first application. For example, a number of a first sender included in a target SMS message is 95555, and it is found, by querying a correspondence between a first application and the number of the first sender of an SMS message, that a number of a first sender of an SMS message corresponding to a China Merchants Bank application is 95555. It can be determined to provide the China Merchants Bank application with the target SMS message.

Alternatively, if the target SMS message includes the keyword of the SMS message sent by the sender of the target SMS message, according to the correspondence that is between the first application and the keyword of the SMS message sent by the first sender of the SMS message and that is obtained by querying, when the keyword of the target SMS message is the same as the keyword of the SMS message sent by the first sender of the SMS message corresponding to the first application, the target SMS message may be sent to the first application. For example, a keyword of a target SMS message included in the target SMS message is Alipay™, and it is found, by querying a correspondence between a first application and a keyword of an SMS message sent by a first sender of an SMS message, that a keyword of an SMS message sent by a first sender of an SMS message corresponding to an Alipay™ application is Alipay™. It can be determined to provide the Alipay™ application with the target SMS message.

5850. The operating system provides the first application with the target SMS message.

In this embodiment of the present invention, the first application may directly read the target SMS message. Alternatively, before 5850, the first application may send a message used for requesting for the target SMS message to the operating system, and the operating system may send the target SMS message to the first application according to the request message.

5900. The first application receives and reads the target SMS message, extracts the verification code from the target SMS message, and fills the verification code in a verification code input box.

In this embodiment of the present invention, an operating system of a terminal may extract the verification code from the target SMS message including the verification code, and provide the verification code to the first application. The first application receives the verification code and fills the verification code in the verification code input box.

5950. The first application sends the verification code to the application server.

5951. The application server receives and verifies the verification code.

5952. The application server feeds back a verification result to the first application.

In this embodiment of the present invention, for a local operation such as an operation of registering an account, the application server returns the verification result of the verification code to the first application; for an operation such as login, the operation is executed directly on the application server, and an execution result is returned to the terminal.

5953. The first application executes an operation according to the verification result, or the first application receives an operation success or failure result.

In this embodiment of the present invention, for example, in a login operation, a first application receives a login operation success result or receives a login operation failure result.

Therefore, according to an SMS message reading control method provided in this embodiment of the present invention, a target SMS message generated by an application server corresponding to a first application is received. The target SMS message includes information about a first sender. It is determined, according to the information about the first sender in the target SMS message and a stored correspondence between the first application and the first sender of an SMS message, to provide the first application with the target SMS message, so that the first application obtains the target SMS message. Therefore, the first application can read only an SMS message sent by a specific SMS message sender, thereby improving user experience and protecting user privacy.

Figure 6:
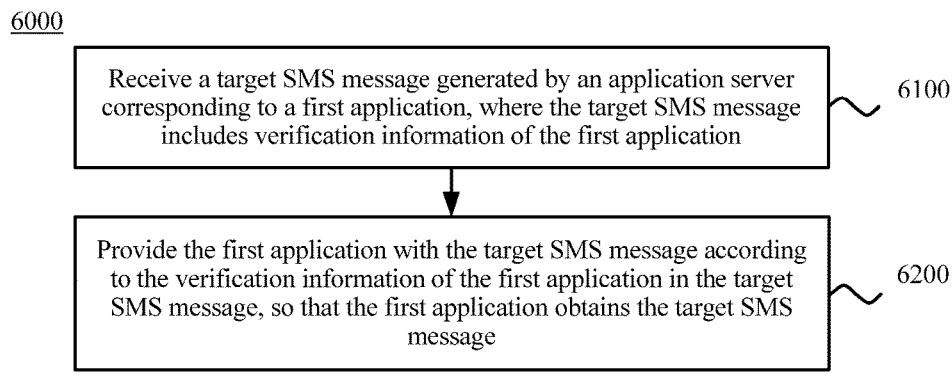
FIG. 6 is a schematic flowchart of an SMS message reading control method according to still yet another embodiment of the present invention.

FIG. 6 is a schematic flowchart of an SMS message reading control method 6000 according to still yet another embodiment of the present invention. The method 6000 shown in FIG. 6 may be executed by a terminal, and the method 6000 includes the following steps.

6100. Receive a target SMS message generated by an application server corresponding to a first application, where the target SMS message includes verification information of the first application.

6200. Determine, according to the verification information of the first application in the target SMS message, to provide the first application with the target SMS message, so that the first application obtains the target SMS message.

It should be understood that, in this embodiment of the present invention, the verification information of the first application may be any one of package name information of the first application, signature certification information of the first application, or random information. The package name information of the first application refers to a field that is used to uniquely identify the first application, and generally is a string. This embodiment of the present invention imposes no limitation on this.

Specifically, in this embodiment of the present invention, when the verification information of the first application is the package name information or the signature certification information of the first application, an operating system of the terminal may store the package name information or the signature certification information of the first application when installing the first application. The operating system of the terminal may receive, by using an SMS server or an instant messaging server, the target SMS message generated by the application server corresponding to the first application, and obtain the package name information or the signature certification information of the first application from the target SMS message, so as to find, according to the package name information or the signature certification information of the first application, a first application corresponding to the package name information or the signature certification information, and determine to provide the first application with the target SMS message, so that the first application reads the target SMS message.

Therefore, according to an SMS message reading control method provided in this embodiment of the present invention, a target SMS message generated by an application server corresponding to a first application is received. The target SMS message includes verification information of the first application; and it is determined, according to the verification information of the first application in the target SMS message, to provide the first application with the target SMS message, so that the first application obtains the target SMS message. Therefore, the first application can read only an SMS message generated by the application server corresponding to the first application, thereby improving user experience and protecting user privacy.

Figure 7:
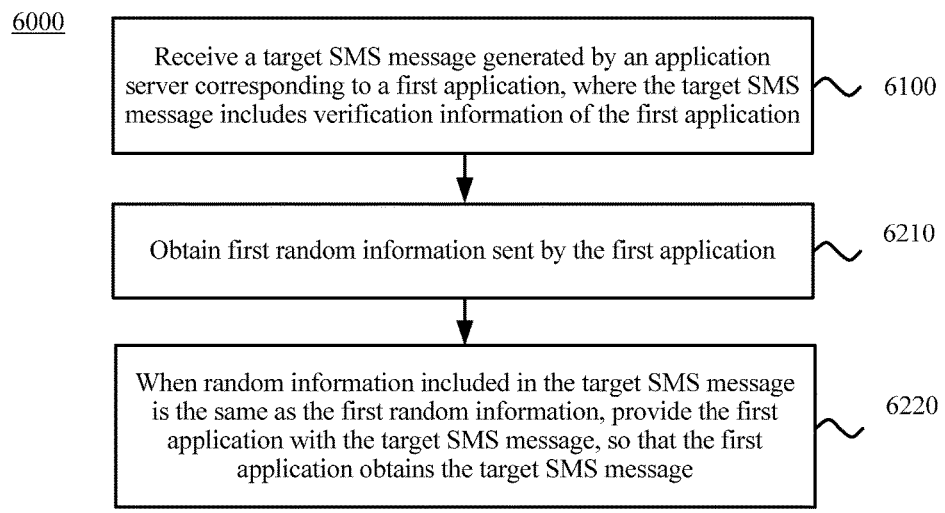
FIG. 7 is a schematic flowchart of an SMS message reading control method according to a further embodiment of the present invention.

Optionally, in an embodiment of the present invention, as shown in FIG. 7, when the verification information of the first application is the random information, 6200 may include the following steps.

6210. Obtain first random information sent by the first application.

6220. When random information included in the target SMS message is the same as the first random information, determine to provide the first application with the target SMS message, so that the first application obtains the target SMS message.

Specifically, in this embodiment of the present invention, when the verification information of the first application is the random information, the operating system of the terminal may receive, by using the SMS server or the instant messaging server, the target SMS message generated by the application server corresponding to the first application, and obtain the random information from the target SMS message. The operating system of the terminal may obtain the first random information sent by the first application. For example, the first random information may be included in a request message, where the request message may be used to request for reading the target SMS message. When the random information included in the target SMS message is the same as the first random information sent by the first application, it is determined to provide the first application with the target SMS message including a verification code, so that the first application obtains the target SMS message.

It should be understood that, in this embodiment of the present invention, the random information may be any one or any combination of information about a digit, a symbol, a letter, a character, or a string. This embodiment of the present invention imposes no limitation on this.

Figure 8A:
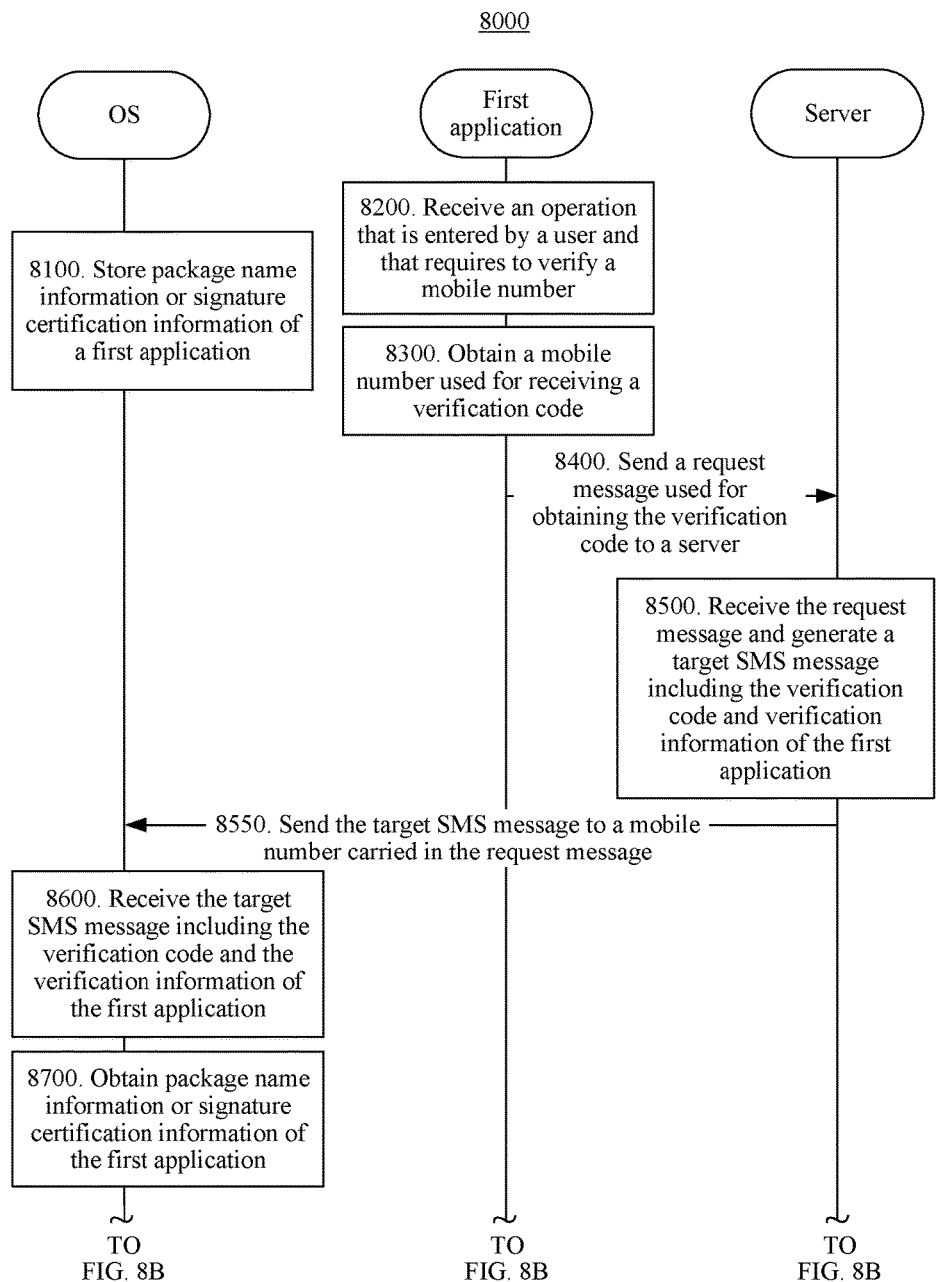
FIG. 8A and FIG. 8B are a schematic diagram of interaction of an SMS message reading control method according to another embodiment of the present invention.
Figure 8B:
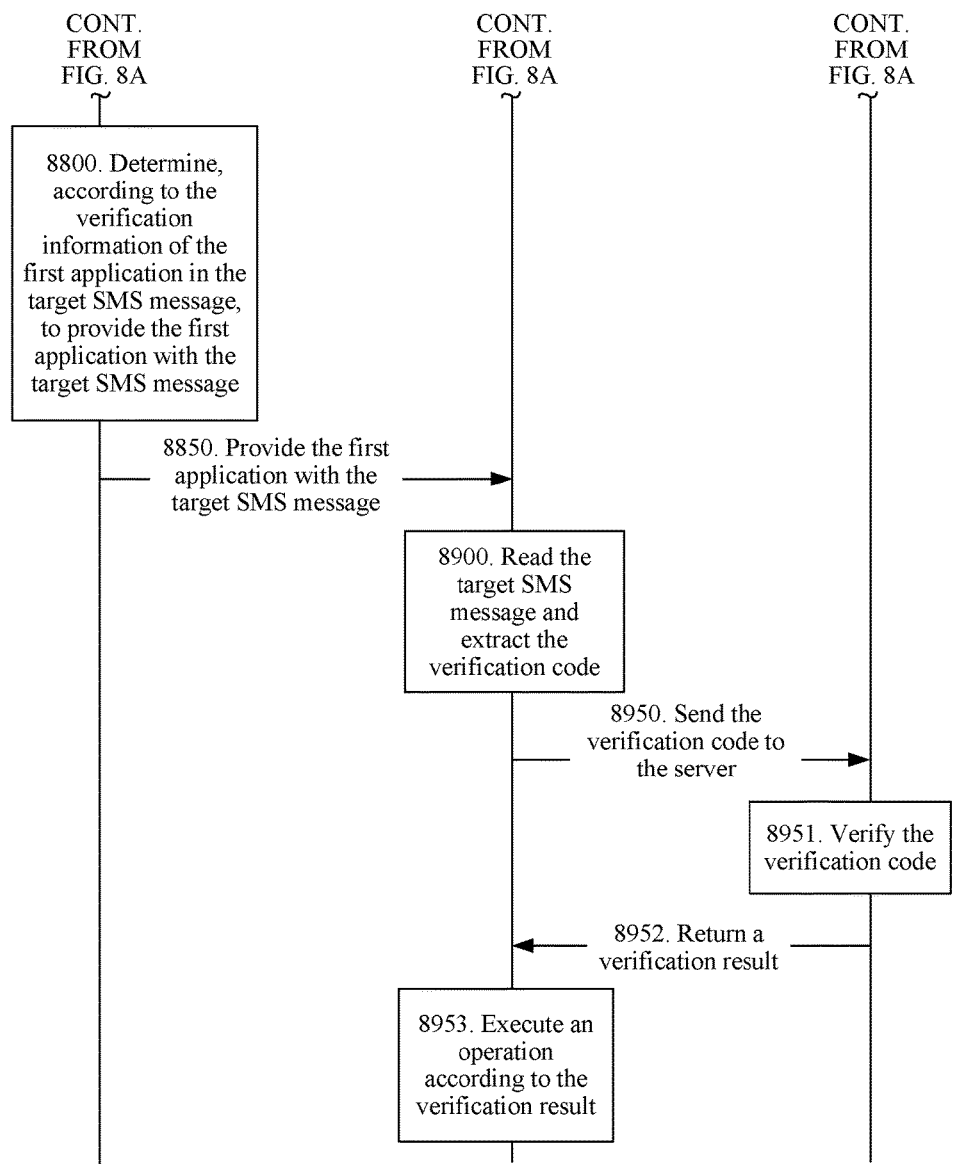
Figure 9A:
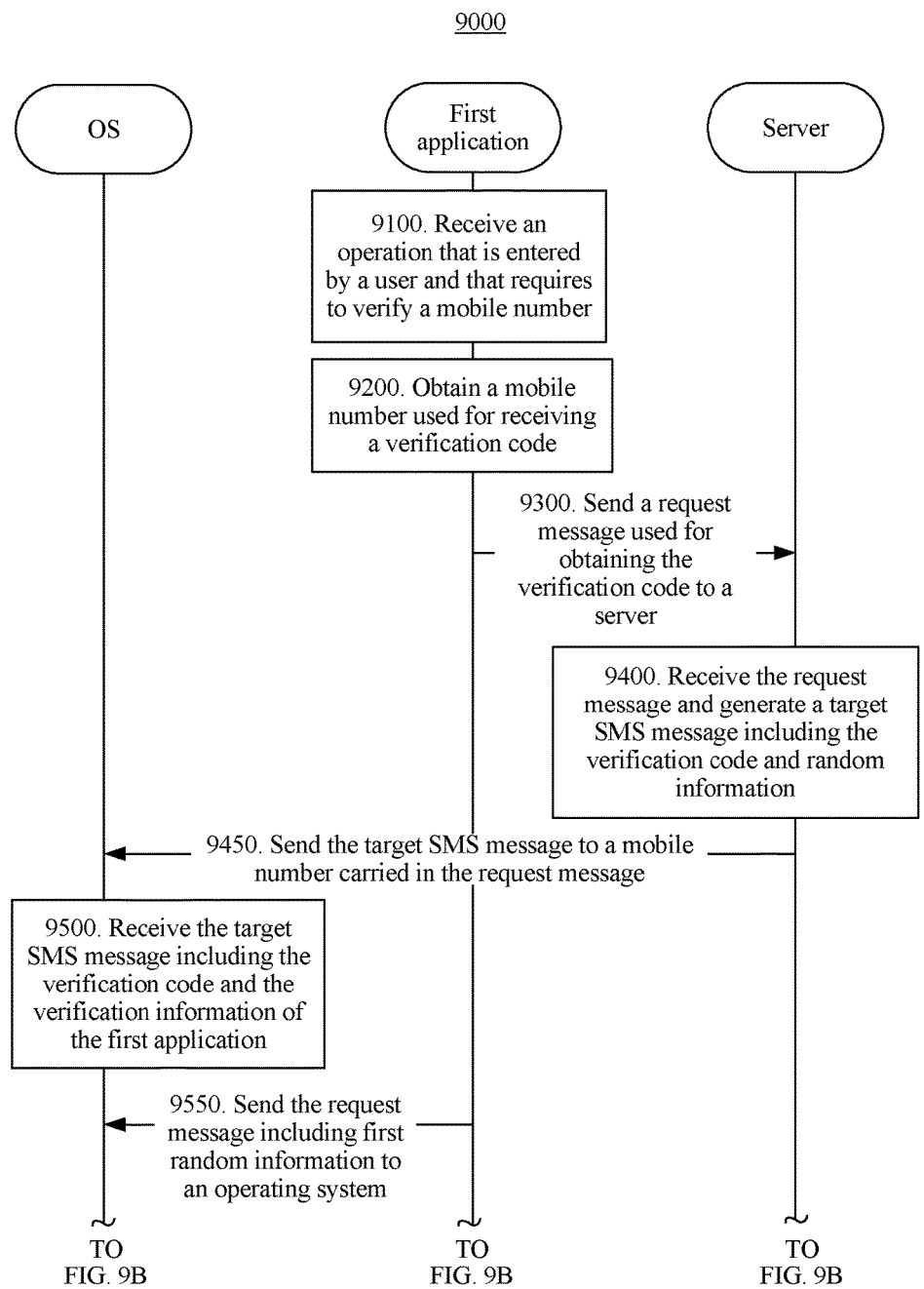
FIG. 9A and FIG. 9B are a schematic diagram of interaction of an SMS message reading control method according to still another embodiment of the present invention.
Figure 9B:
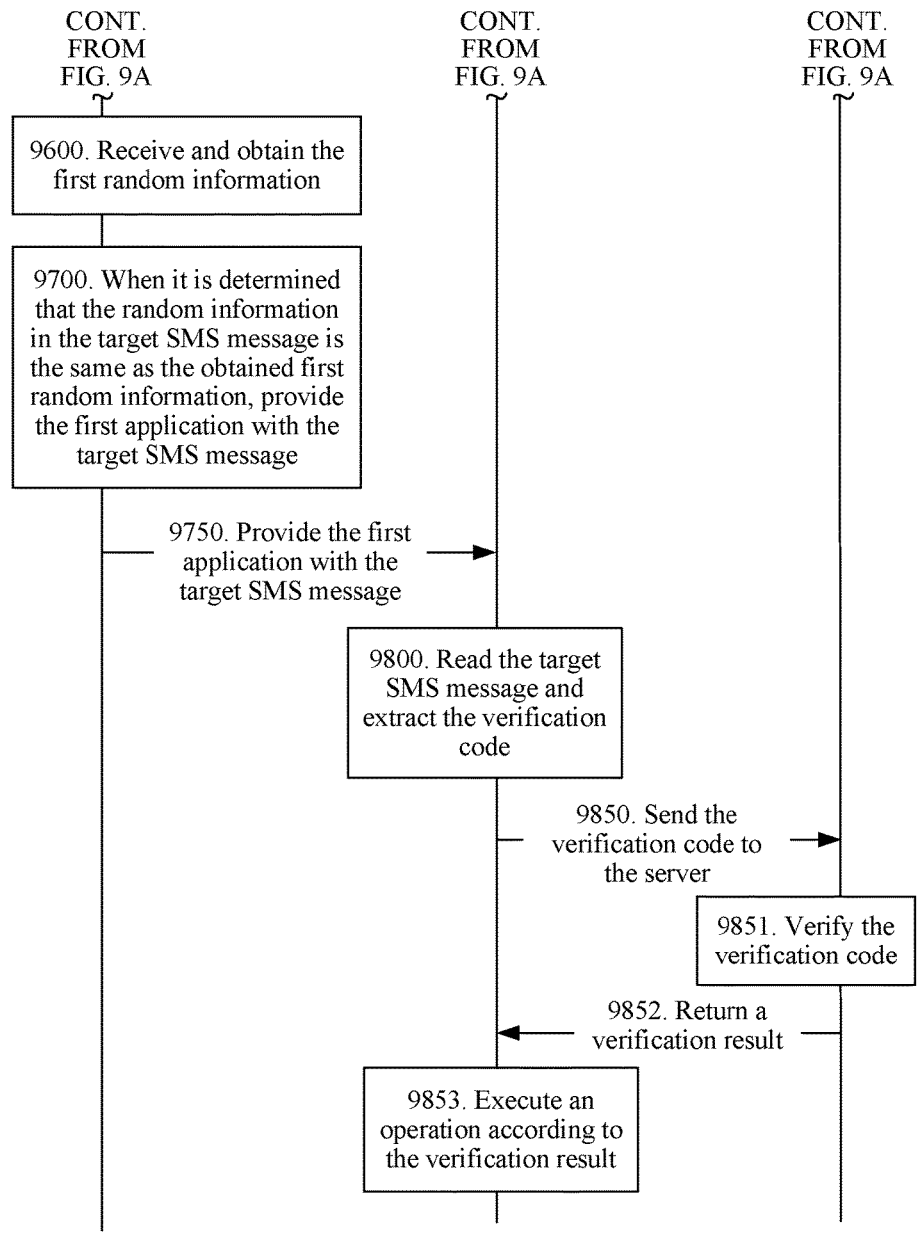

The following uses an operation that requires a user to verify a mobile number as an example and describes in detail the technical solutions of the embodiments of the present invention with reference to a schematic diagram, shown in FIG. 8A and FIG. 8B, of interaction of an SMS message reading control method 8000 according to an embodiment of the present invention and a schematic diagram, shown in FIG. 9A and FIG. 9B, of interaction of an SMS message reading control method 9000 according to an embodiment of the present invention. Both an operating system OS and a first application shown in FIG. 8A and FIG. 8B, and FIG. 9A and FIG. 9B run on a terminal. It should be understood that this is intended to merely describe an example of the technical solutions of the embodiments of the present invention and imposes no limitation on the technical solutions of the embodiments of the present invention.

The method 8000 shown in FIG. 8A and FIG. 8B includes the following steps.

8100. An operating system stores package name information or signature certification information of a first application.

It should be understood that, in this embodiment of the present invention, when installing the first application, the operating system may store the package name information or signature certification information of the first application.

8200. The first application receives an operation that is entered by a user and that requires to verify a mobile number.

In this embodiment of the present invention, the operation that requires to verify the mobile number may include: registering an account, logging in via an SMS message verification code, forgetting a password, resetting a password, and the like. However, this embodiment of the present invention is not limited thereto.

8300. The first application obtains a mobile number used for receiving a verification code.

In this embodiment of the present invention, the mobile number used for receiving the verification code may be a mobile number entered by the user for receiving the verification code, or may be a local mobile number that is directly extracted. This embodiment of the present invention imposes no limitation on this.

8400. The first application sends a request message for obtaining the verification code to an application server corresponding to the first application, where the request message includes the mobile number used for receiving the verification code.

8500. The application server receives the request message sent by the first application and generates a target SMS message including the verification code.

In this embodiment of the present invention, the target SMS message further includes verification information of the first application, for example, includes the package name information of the first application, or includes the signature certification information of the first application, where the signature certification information includes a public key.

8550. The application server sends the target SMS message to the operating system by using an SMS server or an instant messaging server.

In this embodiment of the present invention, the application server sends, by using the SMS server or the instant messaging server, the target SMS message generated by the application server to the mobile number used for receiving the verification code.

8600. The operating system receives the target SMS message, where the target SMS message includes the verification code and verification information of the first application.

8700. The operating system obtains the stored package name information or the signature certification information of the first application.

8800. The operating system determines, according to the verification information of the first application in the target SMS message and the obtained package name information or the signature certification information of the first application, to provide the first application with the target SMS message.

8850. The operating system provides the first application with the target SMS message.

In this embodiment of the present invention, the first application may directly read the target SMS message. Alternatively, before 8850, the first application may send a message used for requesting for the target SMS message to the operating system, and the operating system may send the target SMS message to the first application according to the request message.

8900. The first application receives and reads the target SMS message, extracts the verification code from the target SMS message, and fills the verification code in a verification code input box.

In this embodiment of the present invention, the operating system of the terminal may extract the verification code from the target SMS message including the verification code, and provide the verification code to the first application. The first application receives the verification code and fills the verification code in the verification code input box.

8950. The first application sends the verification code to the application server.

8951. The application server receives and verifies the verification code.

8952. The application server feeds back a verification result to the first application.

In this embodiment of the present invention, for a local operation such as an operation of registering an account, the application server returns the verification result of the verification code to the first application; for an operation such as login, the operation is executed directly on the application server, and an execution result is returned to the terminal.

8953. The first application executes an operation according to the verification result, or the first application receives an operation success or failure result.

In this embodiment of the present invention, for example, in a login operation, a first application receives a login operation success result or receives a login operation failure result.

Therefore, according to an SMS message reading control method provided in this embodiment of the present invention, a target SMS message generated by an application server corresponding to a first application is received. The target SMS message includes verification information of the first application; and it is determined, according to the verification information of the first application in the target SMS message, to provide the first application with the target SMS message, so that the first application obtains the target SMS message. Therefore, the first application can read only an SMS message generated by the application server corresponding to the first application, thereby improving user experience and protecting user privacy.

The method 9000 shown in FIG. 9A and FIG. 9B includes the following steps.

9100. A first application receives an operation that is entered by a user and that requires to verify a mobile number.

In this embodiment of the present invention, the operation that requires to verify the mobile number may include: registering an account, logging in via an SMS message verification code, forgetting a password, resetting a password, and the like. However, this embodiment of the present invention is not limited thereto.

9200. The first application obtains a mobile number used for receiving a verification code.

In this embodiment of the present invention, the mobile number used for receiving the verification code may be a mobile number entered by the user for receiving the verification code, or may be a local mobile number that is directly extracted. This embodiment of the present invention imposes no limitation on this.

9300. The first application sends a request message for obtaining the verification code to an application server corresponding to the first application, where the request message includes the mobile number used for receiving the verification code.

9400. The application server receives the request message sent by the first application and generates a target SMS message including the verification code.

In this embodiment of the present invention, the target SMS message further includes random information, for example, may include a random number, a random letter or character, or the like.

9450. The application server sends the target SMS message to an operating system by using an SMS server or an instant messaging server.

In this embodiment of the present invention, the application server sends, by using the SMS server or the instant messaging server, the target SMS message generated by the application server to the mobile number used for receiving the verification code.

9500. The operating system receives the target SMS message, where the target SMS message includes the verification code and the random information.

9550. The first application sends a request message including first random information to the operating system, where the request message is used to request for reading the target SMS message.

9600. The operating system receives and obtains the first random information.

9700. When determining that random information in the target SMS message is the same as the obtained first random information, the operating system provides the first application with the target SMS message.

In this embodiment of the present invention, it can be determined whether the random information in the target SMS message is the same as the obtained first random information by comparing the random information in the target SMS message and the obtained first random information. For example, the random information in the target SMS message is a random number N, and the first random information in the request message sent by the first application is a random number M. Because the random number N is different from the random number M, the target SMS message is not provided to the first application. If the first random information in the request message sent by the first application is the random number N, the target SMS message is provided to the first application. It should be understood that the foregoing is merely an example used to describe the embodiments of the present invention and does not impose any limitation on the technical solutions of the embodiments of the present invention.

9750. The operating system provides the first application with the target SMS message.

9800. The first application receives and reads the target SMS message, extracts the verification code from the target SMS message, and fills the verification code in the verification code input box.

In this embodiment of the present invention, the operating system of the terminal may extract the verification code from the target SMS message including the verification code, and provide the verification code to the first application. The first application receives the verification code and fills the verification code in the verification code input box.

9850. The first application sends the verification code to the application server.

9851. The application server receives and verifies the verification code.

9852. The application server feeds back a verification result to the first application.

In this embodiment of the present invention, for a local operation such as an operation of registering an account, the application server returns the verification result of the verification code to the first application; for an operation such as login, the operation is executed directly on the application server, and an execution result is returned to the terminal.

9853. The first application executes an operation according to the verification result, or the first application receives an operation success or failure result.

In this embodiment of the present invention, for example, in a login operation, a first application receives a login operation success result or receives a login operation failure result.

Therefore, according to an SMS message reading control method provided in this embodiment of the present invention, a target SMS message generated by an application server corresponding to a first application is received. The target SMS message includes verification information of the first application; and it is determined, according to the verification information of the first application in the target SMS message, to provide the first application with the target SMS message, so that the first application obtains the target SMS message. Therefore, the first application can read only an SMS message generated by the application server corresponding to the first application, thereby improving user experience and protecting user privacy.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail the SMS message reading control method according to the embodiments of the present invention with reference to FIG. 1 to 9. The following describes in detail a terminal according to embodiments of the present invention with reference to FIG. 10 to 14.

Figure 10:
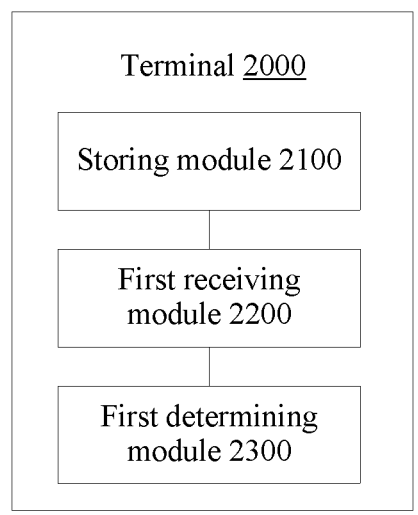
FIG. 10 is a schematic structural diagram of a terminal according to an embodiment of the present invention.

FIG. 10 is a schematic structural diagram of a terminal 2000 according to an embodiment of the present invention. The terminal 2000 shown in FIG. 10 includes a storing module 2100, a first receiving module 2200, and a first determining module 2300.

The storing module 2100 is configured to store a correspondence between a first application and a first sender of an SMS message.

The first receiving module 2200 is configured to receive a target SMS message generated by an application server corresponding to the first application, where the target SMS message includes information about the first sender.

The first determining module 2300 is configured to determine, according to the information about the first sender in the target SMS message received by the first receiving module and the correspondence stored by the storing module, to provide the first application with the target SMS message, so that the first application obtains the target SMS message.

Specifically, to protect user privacy, the first receiving module 2200 of the terminal may receive the target SMS message generated by the application server corresponding to the first application, where the target SMS message includes the information about the first sender. Then, the first determining module 2300 determines, according to the information about the first sender in the target SMS message and the correspondence that is between the first application and the first sender of the SMS message and that is stored by the storing module 2100, to provide the first application with the target SMS message, so that the first application obtains the target SMS message.

It should be understood that, in this embodiment of the present invention, the information about the first sender may be a number of the first sender, or may be a keyword of the target SMS message sent by the first sender. The keyword of the target SMS message may be a name of the first application. However, this embodiment of the present invention is not limited thereto.

Therefore, according to a terminal provided in this embodiment of the present invention, a target SMS message generated by an application server corresponding to a first application is received. The target SMS message includes information about a first sender; and the target SMS message is provided to the first application according to the information about the first sender in the target SMS message and a stored correspondence between the first application and the first sender of an SMS message, so that the first application obtains the target SMS message. Therefore, the first application can read only an SMS message sent by a specific SMS message sender, thereby improving user experience and protecting user privacy.

It should be understood that, in this embodiment of the present invention, the first receiving module 2200 may be configured to receive the target SMS message that is generated by the application server and sent by an SMS server or an instant messaging server. It should be noted that, in this embodiment of the present invention, the instant messaging server may include WeChat™, QQ™, Credulity™, MSN™, FICQ™, or the like. However, this embodiment of the present invention is not limited thereto. That is, in this embodiment of the present invention, the SMS message may be an SMS message sent by a server of an operator, or may be an instant message sent by the instant messaging server. This embodiment of the present invention imposes no limitation on this. It should be further understood that, in this embodiment of the present invention, the application server corresponding to the first application, for example, an application server corresponding to a QQ™ application is a server of Tencent QQ™, or an application server corresponding to an Alipay™ application is a server of Alipay™. The application server may be a server of an application developer, or may be a server leased by an application developer from another service provider. The present invention imposes no limitation on this.

Specifically, in this embodiment of the present invention, the storing module 2100 may further store the correspondence that is between the first application and the first sender of the SMS message and that is obtained over a network, that is, may store the correspondence between the first application and the first sender of the SMS message that is obtained from a third-party server. For example, a correspondence that is between the first application and a number of the first sender of the SMS message and that is obtained from the third-party server may be stored by using a yellow pages function. Alternatively, a correspondence that is between the first application and a keyword of an SMS message sent by the first sender of the SMS message and that is obtained from the third-party server may be stored.

It should be understood that, in this embodiment of the present invention, a keyword of an SMS message may be a name of an application. For example, content of an SMS message is: an SMS message/a multimedia message from Tencent™. A keyword of the SMS message is Tencent™. However, this embodiment of the present invention is not limited thereto. A keyword of the SMS message may be a keyword obtained in another manner of extracting a keyword.

Optionally, in another embodiment of the present invention, the storing module 2100 may further store the locally obtained correspondence between the first application and the first sender of the SMS message.

Figure 11:
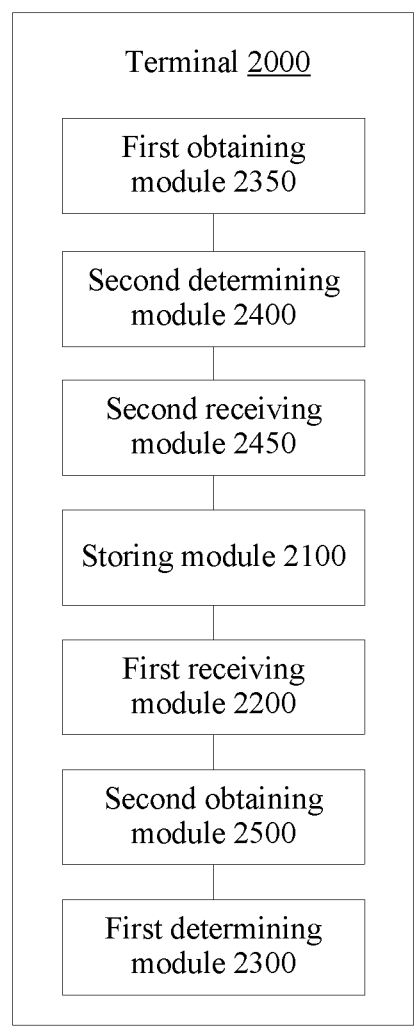
FIG. 11 is a schematic structural diagram of a terminal according to another embodiment of the present invention.
Figure 12:
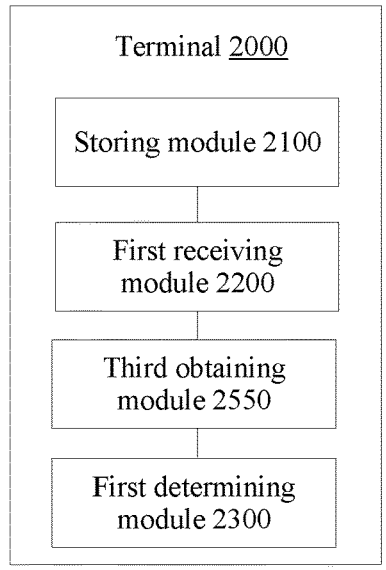
FIG. 12 is a schematic structural diagram of a terminal according to still another embodiment of the present invention.

The following describes in detail a technical solution to storing the locally obtained correspondence between the first application and the first sender of the SMS message with reference to FIG. 11 and FIG. 12.

Specifically, in this embodiment of the present invention, as shown in FIG. 11, the storing module 2100 is specifically configured to store a correspondence between the first application and a number of the first sender of the SMS message in a registration list.

Alternatively, in this embodiment of the present invention, in addition to storing the correspondence between the first application and the number of the first sender of the SMS message in the registration list, the correspondence between the first application and the number of the first sender of the SMS message may be stored by using a yellow pages service.

As shown in FIG. 11, the terminal 2000 further includes a first obtaining module 2350, a second determining module 2400, a second receiving module 2450, and a second obtaining module 2500.

The first obtaining module 2350 is configured to obtain the number of the first sender of the SMS message.

Specifically, in this embodiment of the present invention, the first obtaining module 2350 is specifically configured to: when the first application is installed, record the number that is of the first sender of the SMS message and that is in an installation package of the first application.

That is, a configuration file of the installation package of the first application includes the number that needs to be received by the first application and that is of the first sender of the SMS message. When the first application is installed, an operating system of the terminal may obtain the number of the first sender of the SMS message from the configuration file of the installation package.

Alternatively, when the first application is run, the operating system of the terminal sends a request message to the application server corresponding to the first application to obtain the number of the first sender of the SMS message, and receives and records the number, sent by the application server, of the first sender of the SMS message. That is, when running the first application, the operating system of the terminal may send a first request message used for obtaining the number of the first sender of the SMS message to the application server corresponding to the first application, where the first request message may include a mobile number used for receiving the SMS message. The application server may feed back, to the operating system of the terminal according to the first request message, the number of the first sender of the SMS message that needs to be received by the first application, and the operating system of the terminal receives and records the number of the first sender of the SMS message.

It should be understood that, in this embodiment of the present invention, the mobile number used for receiving the SMS message may be a mobile number entered by a user for receiving the SMS message, or may be a local mobile number that is directly extracted. This embodiment of the present invention imposes no limitation on this.

The second determining module 2400 is configured to determine that the number of the first sender of the SMS message is not registered by another application; or is configured to determine that the number of the first sender of the SMS message is a common service number.

Specifically, in this embodiment of the present invention, after the first obtaining module 2350 obtains the number of the first sender of the SMS message, the second determining module 2400 further needs to determine validity of the number of the first sender of the SMS message. That is, there is a need to determine that the number of the first sender of the SMS message is not registered by another application, or there is a need to determine that the number of the first sender of the SMS message is a common service number. It should be understood that, in this embodiment of the present invention, the common service number means that the number of the first sender of the SMS message is not a number of a mobile phone contact but a number used for a public service, for example, a service number of China Merchants Bank™, 95555, and a service number of Alipay™, 95188.

The second receiving module 2450 is configured to receive first input of the user, where the first input is used to instruct to store the correspondence between the first application and the number of the first sender of the SMS message.

Specifically, in this embodiment of the present invention, after the first obtaining module 2350 obtains the number of the first sender of the SMS message, the second receiving module 2450 of the terminal may receive the first input of the user, and store the correspondence between the first application and the number of the first sender of the SMS message according to the first input. For example, after it is determined that the number of the first sender of the SMS message is not registered by another application other than the first application, or is the common service number, the correspondence between the first application and the number of the first sender of the SMS message is stored in the registration list according to a received first instruction.

The second obtaining module 2500 is configured to obtain the correspondence between the first application and the number of the first sender of the SMS message.

Specifically, in this embodiment of the present invention, the first determining module 2300 is specifically configured to search the correspondence between the first application and the number of the first sender of the SMS message; and when a number of a first sender in the target SMS message is the same as the number of the first sender of the SMS message corresponding to the first application, determine to provide the first application with the target SMS message.

That is, the storing module 2100 stores the correspondence between the first application and the number of the first sender of the SMS message. The first receiving module 2200 receives the target SMS message generated by the application server corresponding to the first application, where the target SMS message includes the information about the first sender. Then, the second obtaining module 2500 obtains a stored correspondence between an application and the number of the first sender of the SMS message. The first determining module 2300 searches the correspondence between the first application and the number of the first sender of the SMS message, and when the number of the first sender in the target SMS message is the same as the number of the first sender of the SMS message corresponding to the first application, determines to provide the first application with the target SMS message. For example, the first application receives and can directly read the target SMS message. Alternatively, before 2300, the first application may send a message used for requesting for reading the target SMS message to the operating system. When it is determined in 2300 to provide the first application with the target SMS message, the terminal may send the target SMS message to the first application according to the request message, and the first application receives and reads the target SMS message.

Therefore, according to a terminal provided in this embodiment of the present invention, a target SMS message generated by an application server corresponding to a first application is received. The target SMS message includes information about a first sender; and the target SMS message is provided to the first application according to the information about the first sender in the target SMS message and a stored correspondence between the first application and the first sender of an SMS message, so that the first application obtains the target SMS message. Therefore, the first application can read only an SMS message sent by a specific SMS message sender, thereby improving user experience and protecting user privacy.

Optionally, in another embodiment of the present invention, as shown in FIG. 12, the terminal 2000 further includes: a third obtaining module 2550, configured to obtain the correspondence between the first application and the keyword of the SMS message of the first sender of the SMS message.

It should be understood that, in this embodiment of the present invention, a keyword of an SMS message may be a name of an application. For example, content of an SMS message is: an SMS message/a multimedia message from Tencent™. A keyword of the SMS message is Tencent™. However, this embodiment of the present invention is not limited thereto. A keyword of the SMS message may be a keyword obtained in another manner of extracting a keyword.

Specifically, in this embodiment of the present invention, the storing module 2100 is specifically configured to store the correspondence between the first application and the keyword of the SMS message sent by the first sender of the SMS message, or configured to store a correspondence that is between the first application and a keyword of an SMS message sent by the first sender of the SMS message and that is obtained from a third-party server.

Specifically, in this embodiment of the present invention, the first determining module 2300 is specifically configured to search the correspondence between the first application and the keyword of the SMS message sent by the first sender of the SMS message; and when a keyword of the target SMS message is the same as the keyword of the SMS message sent by the first sender of the SMS message corresponding to the first application, determine to provide the first application with the target SMS message.

Therefore, according to a terminal provided in this embodiment of the present invention, a target SMS message generated by an application server corresponding to a first application is received. The target SMS message includes information about a first sender. It is determined, according to the information about the first sender in the target SMS message and a stored correspondence between the first application and the first sender of an SMS message, to provide the first application with the target SMS message, so that the first application obtains the target SMS message. Therefore, the first application can read only an SMS message sent by a specific SMS message sender, thereby improving user experience and protecting user privacy.

Figure 13:
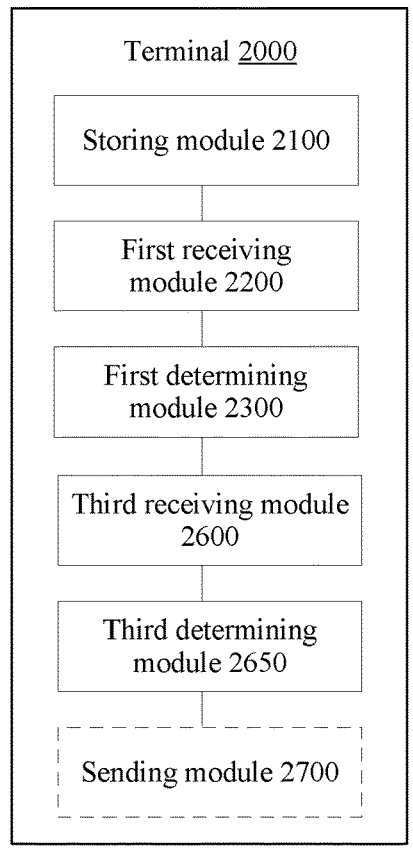
FIG. 13 is a schematic structural diagram of a terminal according to yet another embodiment of the present invention.

Optionally, in another embodiment of the present invention, as shown in FIG. 13, the terminal 2000 further includes: a third receiving module 2600, configured to receive a request message, sent by a second application, for obtaining the target SMS message, where the second application is not corresponding to the first sender; and a third determining module 2650, configured to determine, according to the information about the first sender in the target SMS message and the correspondence, not to provide the second application with the target SMS message.

Optionally, in another embodiment of the present invention, the terminal 2000 further includes: a sending module 2700, configured to send an invalid SMS message to the second application.

Specifically, in this embodiment of the present invention, a storing module 2100 of a terminal stores a correspondence between a first application and a keyword of an SMS message of a first sender of an SMS message. A first receiving module 2200 receives a target SMS message generated by an application server corresponding to the first application. Then, a third receiving module 2600 receives a request message, sent by a second application not corresponding to the first sender, for obtaining the target SMS message. A third determining module 2650 determines, according to information about the first sender in the target SMS message and a stored correspondence between the first application and the first sender of the SMS message, not to send the target SMS message to the second application, so as to ensure that the SMS message sent by the first sender can be read only by the corresponding to first application, thereby improving user experience and protecting user privacy.

In addition, the sending module 2700 included in the terminal 2000 may send the invalid SMS message to the second application, so as to avoid a problem such as a program exception triggered because the second application cannot receive a response. It should be understood that, in this embodiment of the present invention, the invalid SMS message may be empty information, may be an SMS message including privacy data, or may be an SMS message sent by an SMS message sender corresponding to the second application. This embodiment of the present invention imposes no limitation on this.

It should be understood that, in this embodiment of the present invention, the terminal 2000 according to this embodiment of the present invention may be corresponding to an entity for executing the method 1000 according to the embodiment of the present invention, and the foregoing and other operations and/or functions of the modules in the terminal 2000 are respectively used to implement corresponding procedures of the methods in FIG. 1 to FIG. 9A and FIG. 9B. For brevity, details are not described herein.

Figure 14:
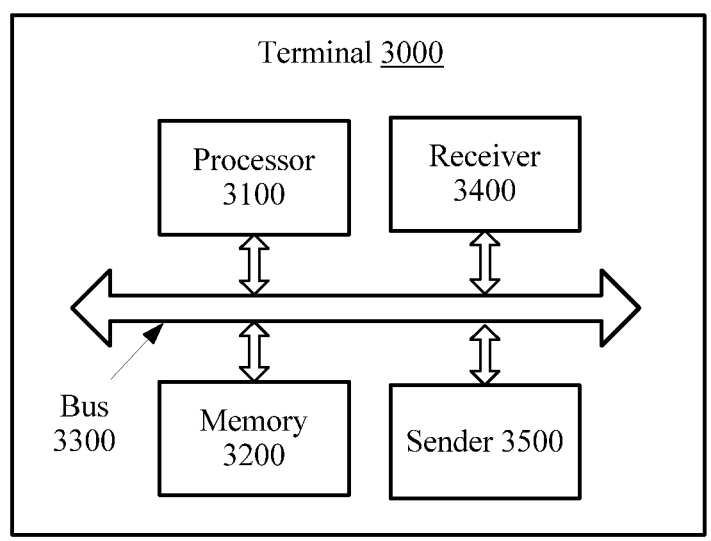
FIG. 14 is a schematic structural diagram of a terminal according to still yet another embodiment of the present invention.

An embodiment of the present invention further provides a terminal 3000. As shown in FIG. 14, the terminal 3000 includes a processor 3100, a memory 3200, a bus system 3300, a receiver 3400, and a sender 3500. The processor 3100, the memory 3200, the receiver 3400, and the sender 3500 are connected by using the bus system 3300. The memory 3200 is configured to store an instruction, and the processor 3100 is configured to execute the instruction stored in the memory 3200. Where:

The memory 3200 is configured to store a correspondence between a first application and a first sender of an SMS message.

The receiver 3400 is configured to receive a target SMS message generated by an application server corresponding to the first application, where the target SMS message includes information about the first sender.

The processor 3100 is configured to: determine, according to the information about the first sender in the target SMS message and the correspondence, to provide the first application with the target SMS message, so that the first application obtains the target SMS message.

In this embodiment of the present invention, the information about the first sender may be a number of the first sender, or may be a keyword of the target SMS message sent by the first sender. The keyword of the target SMS message may be a name of the first application. However, this embodiment of the present invention is not limited thereto.

Therefore, according to a terminal provided in this embodiment of the present invention, a target SMS message generated by an application server corresponding to a first application is received. The target SMS message includes information about a first sender. It is determined, according to the information about the first sender in the target SMS message and a stored correspondence between the first application and the first sender of an SMS message, to provide the first application with the target SMS message, so that the first application obtains the target SMS message. Therefore, the first application can read only an SMS message sent by a specific SMS message sender, thereby improving user experience and protecting user privacy.

It should be noted that, in this embodiment of the present invention, the receiver 3400 may be specifically configured to receive the target SMS message that is generated by the application server and sent by an SMS server or an instant messaging server. It should be noted that, in this embodiment of the present invention, the instant messaging server may include WeChat, QQ, Credulity, MSN, FICQ, or the like. However, this embodiment of the present invention is not limited thereto. That is, in this embodiment of the present invention, the SMS message may be an SMS message sent by a server of an operator, or may be an instant message sent by the instant messaging server. This embodiment of the present invention imposes no limitation on this. It should be further understood that, in this embodiment of the present invention, the application server corresponding to the first application, for example, an application server corresponding to a QQ™ application is a server of Tencent QQ™, or an application server corresponding to an Alipay™ application is a server of Alipay™. The application server may be a server of an application developer, or may be a server leased by an application developer from another service provider. The present invention imposes no limitation on this.

It should be understood that, in this embodiment of the present invention, the processor 3100 may be a central processing unit (CPU), or the processor 3100 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 3200 may include a read-only memory and a random access memory, and provide an instruction and data to the processor 3100. A part of the memory 3200 may further include a nonvolatile random access memory. For example, the memory 3200 may further store information about a device type.

In addition to a data bus, the bus system 3300 may further include a power bus, a control bus, a status signal bus, and the like. However, for clarity of description, various buses are denoted as the bus system 3300 in the figure.

In an implementation process, the steps in the foregoing method may be completed by using an integrated logic circuit of hardware in the processor 3100 or an instruction in a form of software. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 3200. The processor 3100 reads information in the memory 3200, and completes the steps of the foregoing method in combination with hardware of the processor 3100. To avoid repetition, details are not described herein.

Optionally, in an embodiment of the present invention, the memory 3200 is specifically configured to store a correspondence between the first application and a number of the first sender of the SMS message in a registration list, or store a correspondence between the first application and a number of the first sender of the SMS message, or store a correspondence that is between the first application and a number of the first sender of the SMS message and that is obtained from a third-party server.

Optionally, in another embodiment of the present invention, the processor 3100 is further configured to obtain the number of the first sender of the SMS message, and is specifically configured to: when the first application is installed, record the number that is of the first sender of the SMS message and that is in an installation package of the first application; or when the first application is run, send a request message to the application server corresponding to the first application to obtain the number of the first sender of the SMS message, and receive and record the number, sent by the application server, of the first sender of the SMS message.

Optionally, in another embodiment of the present invention, the processor 3100 is further configured to determine that the number of the first sender of the SMS message is not registered by another application, or is configured to determine that the number of the first sender of the SMS message is a common service number.

Optionally, in another embodiment of the present invention, the receiver 3400 is further configured to receive first input of a user, where the first input is used to instruct to store the correspondence between the first application and the number of the first sender of the SMS message.

Optionally, in another embodiment of the present invention, the processor 3100 is specifically configured to search the correspondence between the first application and the number of the first sender of the SMS message; and when a number of a first sender in the target SMS message is the same as the number of the first sender of the SMS message corresponding to the first application, determine to provide the first application with the target SMS message.

Optionally, in another embodiment of the present invention, the processor 3100 is further configured to obtain the correspondence between the first application and the number of the first sender of the SMS message.

Optionally, in another embodiment of the present invention, the memory 3200 is specifically configured to store a correspondence between the first application and a keyword of an SMS message sent by the first sender of the SMS message, or configured to store a correspondence that is between the first application and a keyword of an SMS message sent by the first sender of the SMS message and that is obtained from a third-party server.

It should be understood that, in this embodiment of the present invention, a keyword of an SMS message may be a name of an application. For example, content of an SMS message is: an SMS message/a multimedia message from Tencent™. A keyword of the SMS message is Tencent™. However, this embodiment of the present invention is not limited thereto. A keyword of the SMS message may be a keyword obtained in another manner of extracting a keyword.

Optionally, in another embodiment of the present invention, the processor 3100 is specifically configured to search the correspondence between the first application and the keyword of the SMS message sent by the first sender of the SMS message; and when a keyword of the target SMS message is the same as the keyword of the SMS message sent by the first sender of the SMS message corresponding to the first application, determine to provide the first application with the target SMS message.

Optionally, in another embodiment of the present invention, the processor 3100 is further configured to obtain the correspondence between the first application and the keyword of the SMS message of the first sender of the SMS message.

Optionally, in another embodiment of the present invention, the receiver 3400 is further configured to receive a request message, sent by a second application, for obtaining the target SMS message, where the second application is not corresponding to the first sender.

The processor 3100 is further configured to determine, according to the information about the first sender in the target SMS message and the correspondence, not to provide the second application with the target SMS message.

Optionally, in another embodiment of the present invention, the sender 3500 is configured to send an invalid SMS message to the second application.

In this embodiment of the present invention, the sender 3500 may be configured to send the invalid SMS message to the second application, so as to avoid a problem such as a program exception triggered because the second application cannot receive a response. It should be understood that, in this embodiment of the present invention, the invalid SMS message may be empty information, may be an SMS message including privacy data, or may be an SMS message sent by an SMS message sender corresponding to the second application. This embodiment of the present invention imposes no limitation on this.

It should be understood that, in this embodiment of the present invention, the terminal 3000 according to this embodiment of the present invention may be corresponding to an entity for executing the method 1000 according to the embodiment of the present invention and the terminal 2000 according to the embodiment of the present invention, and the foregoing and other operations and/or functions of the modules in the terminal 3000 are respectively used to implement corresponding procedures of the methods in FIG. 1 to FIG. 9A and FIG. 9B. For brevity, details are not described herein.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for purposes of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, or may be electronic or mechanical connections, or connections of other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   storing, by a terminal, a correspondence between a first application and a first sender of a first short message service (SMS) message;
   receiving, by the terminal, a target SMS message generated by an application server, the target SMS message corresponding to the first application, wherein the target SMS message comprises information corresponding to the first sender;
   after receiving the target SMS message, receiving, by the terminal, a request message, sent by a second application, requesting the target SMS message, wherein the second application does not correspond to the first sender; and
   determining, by the terminal, according to the information corresponding to the first sender in the target SMS message and according to the correspondence between the first application and the first sender of the first SMS message, to provide the first application with the target SMS message and to not provide the second application with the target SMS message.

2. The method according to claim 1, wherein storing the correspondence between the first application and the first sender of the first SMS message comprises:
   storing a correspondence between the first application and a first number of the first sender of the first SMS message in a registration list.

3. The method according to claim 2, wherein the method further comprising:
   obtaining the first number of the first sender of the first SMS message before storing the correspondence between the first application and the first number of the first sender of the first SMS message in the registration list.

4. The method according to claim 3, wherein obtaining the first number of the first sender of the first SMS message comprises:
   recording a number of the first sender of the first SMS message, wherein the number is in an installation package of the first application, in response to the first application being installed.

5. The method according to claim 3, wherein the method further comprises:
   determining that the first number of the first sender of the first SMS message is not registered by another application, after obtaining the first number of the first sender of the first SMS message.

6. The method according to claim 3, wherein the method further comprises:
   determining that the first number of the first sender of the first SMS message is a common service number, after obtaining the first number of the first sender of the first SMS message.

7. The method according to claim 3, wherein the method further comprises:
   receiving a first input of a user, wherein the first input instructs the terminal to store the correspondence between the first application and the first number of the first sender of the first SMS message, after obtaining the first number of the first sender of the first SMS message.

8. The method according to claim 2, wherein determining to provide the first application with the target SMS message comprises:
   searching for the correspondence between the first application and the first number of the first sender of the first SMS message; and
   determining to provide the first application with the target SMS message, wherein a number of a sender in the target SMS message matches the first number of the first sender of the first SMS message corresponding to the first application.

9. The method according to claim 2, wherein the method further comprises:
   obtaining the correspondence between the first application and the first number of the first sender of the first SMS message, before determining to provide the first application with the target SMS message.

10. The method according to claim 1, wherein storing the correspondence between the first application and the first sender of the first SMS message comprises:
    storing a correspondence between the first application and a first number of the first sender of the first SMS message using a yellow pages service.

11. The method according to claim 1, wherein storing the correspondence between the first application and the first sender of the first SMS message comprises:
storing a correspondence between the first application and a first number of the first sender of the first SMS message, wherein the correspondence is obtained from a third-party server.

12. The method according to claim 1, wherein storing the correspondence between the first application and the first sender of the first SMS message comprises:
storing a correspondence between the first application and a keyword of a second SMS message sent by the first sender of the first SMS message.

13. The method according to claim 12, wherein determining to provide the first application with the target SMS message comprises:
searching for a correspondence between the first application and the keyword of the second SMS message; and
determining to provide the first application with the target SMS message, in response to a keyword of the target SMS message matching the keyword of the second SMS message, the second SMS message corresponding to the first application.

14. The method according to claim 12, the method further comprising:
obtaining the correspondence between the first application and the keyword of the second SMS message, before determining to provide the first application with the target SMS message.

15. The method according to claim 1, wherein storing the correspondence between the first application and the first sender of the first SMS message comprises:
storing a correspondence between the first application and a keyword of the first SMS message sent by the first sender, wherein the first SMS message is obtained from a third-party server.

16. The method according to claim 1, wherein the method further comprises:
sending an invalid SMS message to the second application.

17. A terminal comprising:
a processor; and
a non-transitory computer readable storage medium storing a program to be executed by the processor, the program including instructions for:
storing a correspondence between a first application and a first sender of a short message service (SMS) message;
receiving a target SMS message generated by an application server, the target SMS message corresponding to the first application, wherein the target SMS message comprises information corresponding to the first sender;
after receiving the target SMS message, receiving a request message, sent by a second application, requesting the target SMS message, wherein the second application does not correspond to the first sender; and
determining, according to the information corresponding to the first sender in the target SMS message and according the correspondence, to provide the first application with the target SMS message and to not provide the second application with the target SMS message.

18. The terminal according to claim 17, wherein the program includes further instructions for:
sending an empty SMS message to the second application.

19. A non-transitory computer readable storage medium storing a program for execution by a processor of a terminal, the program including instructions for:
storing a correspondence between a first application and a first sender of a short message service (SMS) message;
receiving a target SMS message generated by an application server, the target SMS message corresponding to the first application, wherein the target SMS message comprises information corresponding to the first sender;
after receiving the target SMS message, receiving a request message, sent by a second application, requesting the target SMS message, wherein the second application does not corresponding to the first sender; and
determining, according to the information corresponding to the first sender in the target SMS message and according the correspondence, to provide the first application with the target SMS message and to not provide the second application with the target SMS message.

20. The non-transitory computer readable storage medium according to claim 19, wherein the program includes further instructions for:
sending an invalid SMS message to the second application.

* * * * *